US012720478B2

(12) United States Patent
Quan et al.

(10) Patent No.: US 12,720,478 B2
(45) Date of Patent: Aug. 25, 2026

(54) POSITIONING METHOD AND APPARATUS, AND TERMINAL AND STORAGE MEDIUM

(71) Applicant: DATANG MOBILE COMMUNICATIONS EQUIPMENT CO., LTD., Beijing (CN)

(72) Inventors: Haiyang Quan, Beijing (CN); Jianxiang Li, Beijing (CN); Jing Fu, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 352 days.

(21) Appl. No.: 18/546,774

(22) PCT Filed: Mar. 14, 2022

(86) PCT No.: PCT/CN2022/080788
§ 371 (c)(1),
(2) Date: Aug. 16, 2023

(87) PCT Pub. No.: WO2022/194115
PCT Pub. Date: Sep. 22, 2022

(65) Prior Publication Data

US 2024/0137904 A1 Apr. 25, 2024
US 2024/0236929 A9 Jul. 11, 2024

(30) Foreign Application Priority Data

Mar. 18, 2021 (CN) ......................... 202110290620.3

(51) Int. Cl.
*H04W 64/00* (2009.01)
*H04W 8/00* (2009.01)

(52) U.S. Cl.
CPC ......... *H04W 64/003* (2013.01); *H04W 8/005* (2013.01)

(58) Field of Classification Search
CPC ............................ H04W 64/003; H04W 8/005
(Continued)

(56) References Cited

U.S. PATENT DOCUMENTS

2019/0239181 A1 8/2019 Gangakhedkar et al.
2019/0349881 A1 11/2019 Choi et al.

FOREIGN PATENT DOCUMENTS

CN 105813018 A 7/2016
CN 107645771 A 1/2018
(Continued)

OTHER PUBLICATIONS

European Patent Office, Extended European Search Report Issued in Application No. 22770470.7, Dec. 22, 2023, Germany, 9 pages.
(Continued)

*Primary Examiner* — Joel Ajayi
(74) *Attorney, Agent, or Firm* — KILPATRICK TOWNSEND & STOCKTON LLP

(57) ABSTRACT

Provided in the present application are a positioning method and apparatus, and a terminal and a storage medium. On a first terminal side, the positioning method includes: acquiring positioning service information of a target terminal; determining from the target terminal, according to the positioning service information, a primary positioning terminal for providing a primary positioning service and a secondary positioning terminal for providing a secondary positioning service; and performing positioning for a location of a first terminal based on the primary positioning terminal and the secondary positioning terminal. Since the positioning of the first terminal can be assisted by the primary positioning terminal and the secondary positioning terminal, the location of the first terminal can be accurately positioned even if a
(Continued)

network coverage area where the first terminal is located does not have a proper positioning server therein to provide a positioning service.

14 Claims, 8 Drawing Sheets

(58) Field of Classification Search
USPC .................................................... 455/456.5
See application file for complete search history.

(56) References Cited

FOREIGN PATENT DOCUMENTS

| | | | |
|---|---|---|---|
| CN | 109196925 | A | 1/2019 |
| CN | 109792584 | A | 5/2019 |
| CN | 110036307 | A | 7/2019 |
| CN | 110536234 | A | 12/2019 |
| CN | 111757259 | A | 10/2020 |
| WO | 2015188446 | A1 | 12/2015 |
| WO | 2019197036 | A1 | 10/2019 |
| WO | 2020064120 | A1 | 4/2020 |
| WO | 2020125310 | A1 | 6/2020 |
| WO | 2020215883 | A1 | 10/2020 |
| WO | 2021027861 | A1 | 2/2021 |

OTHER PUBLICATIONS

Ericsson, "LPP signalling for integrity support of RAT dependent positioning", 3GPP TSG-RAN WG2 #111e, Electronic meeting, Aug. 17-28, 2020, total 5 pages, R2-2006957.

State Intellectual Property Office of the People's Republic of China, Notice of Allowance Issued in Application No. 202110290620.3, Oct. 31, 2024, 5 pages.

Fraunhofer IIS et al., "Study on NR Sidelink Positioning", 3GPP TSG RAN Meeting #88e, Electronic Meeting, Jun. 29-Jul. 3, 2020, total 3 pages, RP-201062.

ISA State Intellectual Property Office of the People's Republic of China, International Search Report and Written Opinion of the International Searching Authority Issued in Application No. PCT/CN2022/080788, Jun. 2, 2022, WIPO, 12 pages.

State Intellectual Property Office of the People's Republic of China, Office Action and Search Report Issued in Application No. 202110290620.3, May 6, 2024, 30 pages.

POSITIONING METHOD AND APPARATUS, AND TERMINAL AND STORAGE MEDIUM

This application is a National Stage of International Application No. PCT/CN2022/080788, filed on Mar. 14, 2022, which claims priority to Chinese Patent Application No. 202110290620.3, filed with the China National Intellectual Property Administration on Mar. 18, 2021 and entitled "POSITIONING METHOD AND APPARATUS, AND TERMINAL AND STORAGE MEDIUM". The two applications are incorporated herein by reference in their entireties.

FIELD

The present application relates to the field of communication technologies and, in particular, to a positioning method and apparatus, and a terminal and a storage medium.

BACKGROUND

With the advent of a 5G era, the Internet of Things and the intelligence place higher requirements on location-based services. As a new direction, the 5G new radio (NR) positioning technology can meet positioning requirements under different application scenarios at high precision.

Currently, when using the 5G NR positioning technology for terminal positioning, it is necessary to transmit positioning capability of a terminal to a positioning server via the terminal, then the positioning server determines a positioning method according to the positioning capability of the terminal and transmits same to the terminal, and the terminal performs a corresponding positioning measurement based on the positioning method and a base station, to obtain a positioning result of the terminal.

In the above-described positioning technology, when a network coverage area where the terminal is located does not have a proper positioning server therein to provide a positioning service, it is impossible to implement the terminal positioning.

SUMMARY

The present application provides a positioning method and apparatus, and a terminal and a storage medium, for solving the problem that it is impossible to implement terminal positioning when a network coverage area where the terminal is located does not have a proper positioning server therein to provide a positioning service.

In one embodiment, the present application provides a positioning method applied to a first terminal and including: acquiring positioning service information of a target terminal; determining from the target terminal, according to the positioning service information, a primary positioning terminal for providing a primary positioning service and a secondary positioning terminal for providing a secondary positioning service; and performing positioning for a location of the first terminal based on the primary positioning terminal and the secondary positioning terminal.

In another embodiment of the present application, the first terminal establishes communicative connection with the target terminal through a direct communication interface.

In another embodiment of the present application, the acquiring the positioning service information of the target terminal includes: receiving, through a direct communication interface, the positioning service information transmitted by the target terminal.

In another embodiment of the present application, the acquiring the positioning service information of the target terminal includes: transmitting a positioning service information acquisition request to the target terminal through a direct communication interface; and receiving the positioning service information transmitted by the target terminal.

In another embodiment of the present application, the acquiring the positioning service information of the target terminal includes: acquiring the positioning service information of the target terminal from a network device.

In another embodiment of the present application, the acquiring the positioning service information of the target terminal from the network device includes: transmitting a positioning service information acquisition request to the network device, where the first terminal is located within a coverage range of the network device; and receiving the positioning service information of the target terminal transmitted by the network device.

In another embodiment of the present application, the acquiring the positioning service information of the target terminal includes: acquiring the positioning service information of the target terminal from a storage medium of the first terminal if it is determined that the first terminal is out of a coverage range of the network device, where the positioning service information of the target terminal is acquired and stored from the network device under a circumstance that the first terminal is within the coverage range of the network device.

In another embodiment of the present application, the determining from the target terminal, according to the positioning service information, the primary positioning terminal for providing the primary positioning service includes: determining from the target terminal, according to the positioning service information, at least one terminal for providing the primary positioning service; and screening from the determined at least one terminal, according to positioning capability information of each determined terminal, a movement speed and a channel condition between the terminal and the first terminal, the primary positioning terminal for providing the primary positioning service.

In another embodiment of the present application, after the determining the primary positioning terminal for providing the primary positioning service and the secondary positioning terminal for providing the secondary positioning service, the positioning method further includes: transmitting, to the primary positioning terminal, a first positioning service message indicative of providing the primary positioning service; or transmitting, to a network device, a first positioning service message indicative of providing the primary positioning service, and the network device, upon reception of the first positioning service message, forwards the first positioning service message to the primary positioning terminal.

In another embodiment of the present application, after the determining the primary positioning terminal for providing the primary positioning service and the secondary positioning terminal for providing the secondary positioning service, the positioning method further includes: transmitting, to the secondary positioning terminal, a second positioning service message indicative of providing the secondary positioning service; or transmitting, to a network device, a second positioning service message indicative of providing the secondary positioning service, and the network device, upon reception of the second positioning service message, forwards the second positioning service message to the secondary positioning terminal.

In another embodiment of the present application, the performing the positioning for the location of the first terminal based on the primary positioning terminal and the secondary positioning terminal includes: transmitting positioning capability information of the first terminal to the primary positioning terminal; receiving a positioning method for positioning measurement of the first terminal determined by the primary positioning terminal according to the positioning capability information; performing measurement of a positioning reference signal with the secondary positioning terminal based on the positioning method to obtain a measurement result; and obtaining the location of the first terminal based on the measurement result.

In another embodiment of the present application, if the measurement result includes a first measurement result, the performing the measurement of the positioning reference signal with the secondary positioning terminal based on the positioning method to obtain the measurement result includes: receiving a first positioning signal transmitted by the secondary positioning terminal; and measuring the first positioning signal based on the positioning method to obtain the first measurement result.

In another embodiment of the present application, if the measurement result includes a second measurement result, the performing the measurement of the positioning reference signal with the secondary positioning terminal based on the positioning method to obtain the measurement result includes: transmitting a second positioning signal to the secondary positioning terminal; and receiving the second measurement result, where the second measurement result is obtained from measurement, by the secondary positioning terminal, of the second positioning signal based on the positioning method.

In another embodiment of the present application, the obtaining the location of the first terminal based on the measurement result includes: transmitting the first measurement result and/or the second measurement result to the primary positioning terminal; receiving a positioning result transmitted by the primary positioning terminal, and obtaining the location of the first terminal according to the positioning result, where the positioning result is obtained from calculation, by the primary positioning terminal, of the first measurement result and/or the second measurement result based on the positioning method.

In another embodiment of the present application, the obtaining the location of the first terminal based on the measurement result includes: calculating the first measurement result and/or the second measurement result based on the positioning method to obtain a positioning result of the first terminal.

In another embodiment, the present application provides a positioning method applied to a primary positioning terminal, where the primary positioning terminal is configured to provide a primary positioning service for a first terminal, and the positioning method includes: receiving positioning capability information of the first terminal; determining, according to the positioning capability information of the first terminal, a positioning method for positioning measurement of the first terminal, and transmitting the positioning method to the first terminal; receiving a measurement result obtained from measurement, by the first terminal, of a positioning reference signal with a secondary positioning terminal based on the positioning method; and obtaining a positioning result of the first terminal based on the measurement result, and transmitting the positioning result to the first terminal; where the secondary positioning terminal is configured to provide a secondary positioning service.

In another embodiment of the present application, at least two terminals of the first terminal, the primary positioning terminal and the secondary positioning terminal are communicatively connected through a direct communication interface.

In another embodiment of the present application, the receiving the measurement result obtained from the measurement, by the first terminal, of the positioning reference signal with the secondary positioning terminal based on the positioning method includes: receiving a first measurement result transmitted by the first terminal, where the first measurement result is obtained from measurement, by the first terminal, of a first positioning signal based on the positioning method, and the first positioning signal is transmitted by the secondary positioning terminal to the first terminal; and/or, receiving a second measurement result, where the second measurement result is obtained from measurement, by the secondary positioning terminal, of a second positioning signal based on the positioning method, and the second positioning signal is transmitted by the first terminal to the secondary positioning terminal.

In another embodiment of the present application, before the receiving the positioning capability information of the first terminal, the positioning method further includes: transmitting positioning service information to the first terminal through a direct communication interface or a network device.

In another embodiment of the present application, before the receiving the positioning capability information of the first terminal, the positioning method further includes: receiving a positioning service information acquisition request transmitted by the first terminal; and transmitting positioning service information to the first terminal according to the positioning service information acquisition request.

In another embodiment of the present application, before the receiving the positioning capability information of the first terminal, the positioning method further includes: receiving a first positioning service message, transmitted by the first terminal through a direct communication interface, indicative of providing the primary positioning service; or receiving a first positioning service message, transmitted by a network device, indicative of providing the primary positioning service, where the first positioning service message is transmitted by the first terminal to the network device.

In yet another embodiment, the present application provides a positioning method applied to a secondary positioning terminal, where the secondary positioning terminal provides a secondary positioning service for a first terminal, and the positioning method includes: receiving a positioning method of the first terminal; performing measurement of a positioning reference signal with the first terminal based on the positioning method to obtain a measurement result; and transmitting the measurement result to the first terminal or a primary positioning terminal, where the measurement result is used for the first terminal or the primary positioning terminal to obtain a positioning result of the first terminal, and where the primary positioning terminal is configured to provide a primary positioning service.

In another embodiment of the present application, at least two terminals of the first terminal, the secondary positioning terminal and the primary positioning terminal are communicatively connected through a direct communication interface.

In another embodiment of the present application, if the measurement result includes a first measurement result, the performing the measurement of the positioning reference signal with the first terminal based on the positioning method to obtain the measurement result includes: transmitting a first positioning signal to the first terminal; and receiving the first measurement result transmitted by the first terminal, where the first measurement result is obtained from measurement, by the first terminal, of the first positioning signal based on the positioning method.

In another embodiment of the present application, if the measurement result includes a second measurement result, the performing the measurement of the positioning reference signal with the first terminal based on the positioning method to obtain the measurement result includes: receiving a second positioning signal transmitted by the first terminal; and measuring the second positioning signal based on the positioning method to obtain the second measurement result.

In another embodiment of the present application, before the receiving the positioning method of the first terminal, the positioning method further includes: receiving a second positioning service message, transmitted by the first terminal, indicative of providing the secondary positioning service; or, receiving a second positioning service message, transmitted by a network device, indicative of providing the secondary positioning service, where the second positioning service message is transmitted by the first terminal to the network device.

In one embodiment, the present application provides a positioning apparatus applied to a first terminal and including: an acquiring device, configured to acquire positioning service information of a target terminal; a determining device, configured to determine from the target terminal, according to the positioning service information, a primary positioning terminal for providing a primary positioning service and a secondary positioning terminal for providing a secondary positioning service; and a processing device, configured to perform positioning for a location of the first terminal based on the primary positioning terminal and the secondary positioning terminal.

In another embodiment of the present application, the first terminal establishes communicative connection with the target terminal through a direct communication interface.

In another embodiment of the present application, the acquiring device is configured to: receive, through a direct communication interface, the positioning service information transmitted by the target terminal.

In another embodiment of the present application, the acquiring device is configured to: transmit a positioning service information acquisition request to the target terminal through a direct communication interface; and receive the positioning service information transmitted by the target terminal.

In another embodiment of the present application, the acquiring device is configured to: acquire the positioning service information of the target terminal from a network device.

In another embodiment of the present application, the acquiring device is configured to: transmit a positioning service information acquisition request to the network device, where the first terminal is located within a coverage range of the network device; and receive the positioning service information of the target terminal transmitted by the network device.

In another embodiment of the present application, the acquiring device is configured to: acquire the positioning service information of the target terminal from a storage medium of the first terminal if it is determined that the first terminal is out of a coverage range of the network device, where the positioning service information of the target terminal is acquired and stored from the network device under a circumstance that the first terminal is within the coverage range of the network device.

In another embodiment of the present application, the determining device is configured to: determine from the target terminal, according to the positioning service information, at least one terminal for providing the primary positioning service; and screen from the determined at least one terminal, according to positioning capability information of each determined terminal, a movement speed and a channel condition between the terminal and the first terminal, the primary positioning terminal for providing the primary positioning service.

In another embodiment of the present application, the positioning apparatus further includes: a transmitting device, configured to transmit, to the primary positioning terminal, a first positioning service message indicative of providing the primary positioning service; or transmit, to a network device, a first positioning service message indicative of providing the primary positioning service, and the network device, upon reception of the first positioning service message, forwards the first positioning service message to the primary positioning terminal.

In another embodiment of the present application, the transmitting device is further configured to: transmit, to the secondary positioning terminal, a second positioning service message indicative of providing the secondary positioning service; or transmit, to a network device, a second positioning service message indicative of providing the secondary positioning service, and the network device, upon reception of the second positioning service message, forwards the second positioning service message to the secondary positioning terminal.

In another embodiment of the present application, the processing device is configured to: transmit positioning capability information of the first terminal to the primary positioning terminal; receive a positioning method for positioning measurement of the first terminal determined by the primary positioning terminal according to the positioning capability information; perform measurement of a positioning reference signal with the secondary positioning terminal based on the positioning method to obtain a measurement result; and obtain the location of the first terminal based on the measurement result.

In another embodiment of the present application, if the measurement result includes a first measurement result, the processing device is configured to: receive a first positioning signal transmitted by the secondary positioning terminal; and measure the first positioning signal based on the positioning method to obtain the first measurement result.

In another embodiment of the present application, if the measurement result includes a second measurement result, the processing device is configured to: transmit a second positioning signal to the secondary positioning terminal; and receive the second measurement result, where the second measurement result is obtained from measurement, by the secondary positioning terminal, of the second positioning signal based on the positioning method.

In another embodiment of the present application, the processing device is configured to: transmit the first measurement result and/or the second measurement result to the primary positioning terminal; receive a positioning result transmitted by the primary positioning terminal, and obtain the location of the first terminal according to the positioning result, where the positioning result is obtained from calculation, by the primary positioning terminal, of the first measurement result and/or the second measurement result based on the positioning method.

In another embodiment of the present application, the processing device is configured to: calculate the first measurement result and/or the second measurement result based on the positioning method to obtain a positioning result of the first terminal.

In one embodiment, the present application provides a positioning apparatus applied to a primary positioning terminal, where the primary positioning terminal is configured to provide a primary positioning service for a first terminal, and the positioning apparatus includes: a receiving device, configured to receive positioning capability information of the first terminal; a determining device, configured to determine, according to the positioning capability information of the first terminal, a positioning method for positioning measurement of the first terminal, and transmit the positioning method to the first terminal, where the receiving device is further configured to receive a measurement result obtained from measurement, by the first terminal, of a positioning reference signal with a secondary positioning terminal based on the positioning method; and a processing device, configured to obtain a positioning result of the first terminal based on the measurement result, and transmit the positioning result to the first terminal; where the secondary positioning terminal is configured to provide a secondary positioning service.

In another embodiment of the present application, at least two terminals of the first terminal, the primary positioning terminal and the secondary positioning terminal are communicatively connected through a direct communication interface.

In another embodiment of the present application, the receiving device is configured to: receive a first measurement result transmitted by the first terminal, where the first measurement result is obtained from measurement, by the first terminal, of a first positioning signal based on the positioning method, and the first positioning signal is transmitted by the secondary positioning terminal to the first terminal;

and/or, receive a second measurement result, where the second measurement result is obtained from measurement, by the secondary positioning terminal, of a second positioning signal based on the positioning method, and the second positioning signal is transmitted by the first terminal to the secondary positioning terminal.

In another embodiment of the present application, the positioning apparatus further includes: a transmitting device, configured to transmit positioning service information to the first terminal through a direct communication interface or a network device.

In another embodiment of the present application, the receiving device is further configured to: receive a positioning service information acquisition request transmitted by the first terminal; and transmit positioning service information to the first terminal according to the positioning service information acquisition request.

In another embodiment of the present application, the receiving device is further configured to: receive a first positioning service message, transmitted by the first terminal through a direct communication interface, indicative of providing the primary positioning service; or receive a first positioning service message, transmitted by a network device, indicative of providing the primary positioning service, where the first positioning service message is transmitted by the first terminal to the network device.

In one embodiment, the present application provides a positioning apparatus applied to a secondary positioning terminal, where the secondary positioning terminal provides a secondary positioning service for a first terminal, and the positioning apparatus includes: a receiving device, configured to receive a positioning method of the first terminal; a processing device, configured to perform measurement of a positioning reference signal with the first terminal based on the positioning method to obtain a measurement result; and a transmitting device, configured to transmit the measurement result to the first terminal or a primary positioning terminal, where the measurement result is used for the first terminal or the primary positioning terminal to obtain a positioning result of the first terminal, and where the primary positioning terminal is configured to provide a primary positioning service.

In another embodiment of the present application, at least two terminals of the first terminal, the secondary positioning terminal and the primary positioning terminal are communicatively connected through a direct communication interface.

In another embodiment of the present application, if the measurement result includes a first measurement result, the processing device is configured to: transmit a first positioning signal to the first terminal; and device receive the first measurement result transmitted by the first terminal, where the first measurement result is obtained from measurement, by the first terminal, of the first positioning signal based on the positioning method.

In another embodiment of the present application, if the measurement result includes a second measurement result, the processing device is configured to: receive a second positioning signal transmitted by the first terminal; and device measure the second positioning signal based on the positioning method to obtain the second measurement result.

In another embodiment of the present application, the receiving device is further configured to: receive a second positioning service message, transmitted by the first terminal, indicative of providing the secondary positioning service; or, receive a second positioning service message, transmitted by a network device, indicative of providing the secondary positioning service, where the second positioning service message is transmitted by the first terminal to the network device.

In one embodiment, the present application provides a terminal which is a first terminal, where the first terminal includes: a memory, configured to store a computer program; a processor, configured to read the computer program in the memory; and a transceiver, configured to transceive data under control of a processor; where the processor is further configured to execute operations of: acquiring positioning service information of a target terminal; determining from the target terminal, according to the positioning service information, a primary positioning terminal for providing a primary positioning service and a secondary positioning terminal for providing a secondary positioning service; and performing positioning for a location of the first terminal based on the primary positioning terminal and the secondary positioning terminal.

In another embodiment of the present application, the first terminal establishes communicative connection with the target terminal through a direct communication interface.

In another embodiment of the present application, the processor is further configured to execute an operation of: receiving, through a direct communication interface, the positioning service information transmitted by the target terminal.

In another embodiment of the present application, the processor is further configured to execute operations of: transmitting a positioning service information acquisition request to the target terminal through a direct communication interface; and receiving the positioning service information transmitted by the target terminal.

In another embodiment of the present application, the processor is further configured to execute an operation of: acquiring the positioning service information of the target terminal from a network device.

In another embodiment of the present application, the processor is further configured to execute operations of: transmitting a positioning service information acquisition request to the network device, where the first terminal is located within a coverage range of the network device; and receiving the positioning service information of the target terminal transmitted by the network device.

In another embodiment of the present application, the processor is further configured to execute operations of: acquiring the positioning service information of the target terminal from a storage medium of the first terminal if it is determined that the first terminal is out of a coverage range of the network device, where the positioning service information of the target terminal is acquired and stored from the network device under a circumstance that the first terminal is within the coverage range of the network device.

In another embodiment of the present application, the processor is further configured to execute operations of: determining from the target terminal, according to the positioning service information, at least one terminal for providing the primary positioning service; and screening from the determined at least one terminal, according to positioning capability information of each determined terminal, a movement speed and a channel condition between the terminal and the first terminal, the primary positioning terminal for providing the primary positioning service.

In another embodiment of the present application, after determining the primary positioning terminal for providing the primary positioning service and the secondary positioning terminal for providing the secondary positioning service are determined, the processor is further configured to execute an operation of: transmitting, to the primary positioning terminal, a first positioning service message indicative of providing the primary positioning service; or transmitting, to a network device, a first positioning service message indicative of providing the primary positioning service, and the network device, upon reception of the first positioning service message, forwards the first positioning service message to the primary positioning terminal.

In another embodiment of the present application, after determining the primary positioning terminal for providing the primary positioning service and the secondary positioning terminal for providing the secondary positioning service are determined, the processor is further configured to execute an operation of: transmitting, to the secondary positioning terminal, a second positioning service message indicative of providing the secondary positioning service; or transmitting, to a network device, a second positioning service message indicative of providing the secondary positioning service, and the network device, upon reception of the second positioning service message, forwards the second positioning service message to the secondary positioning terminal.

In another embodiment of the present application, the processor is further configured to execute operations of: transmitting positioning capability information of the first terminal to the primary positioning terminal; receiving a positioning method for positioning measurement of the first terminal determined by the primary positioning terminal according to the positioning capability information; performing measurement of a positioning reference signal with the secondary positioning terminal based on the positioning method to obtain a measurement result; and obtaining the location of the first terminal based on the measurement result.

In another embodiment of the present application, if the measurement result includes a first measurement result, the processor is further configured to execute operations of: receiving a first positioning signal transmitted by the secondary positioning terminal; and measuring the first positioning signal based on the positioning method to obtain the first measurement result.

In another embodiment of the present application, if the measurement result includes a second measurement result, the processor is further configured to execute operations of: transmitting a second positioning signal to the secondary positioning terminal; and receiving the second measurement result, where the second measurement result is obtained from measurement, by the secondary positioning terminal, of the second positioning signal based on the positioning method.

In another embodiment of the present application, the processor is further configured to execute operations of: transmitting the first measurement result and/or the second measurement result to the primary positioning terminal; receiving a positioning result transmitted by the primary positioning terminal, and obtaining the location of the first terminal according to the positioning result, where the positioning result is obtained from calculation, by the primary positioning terminal, of the first measurement result and/or the second measurement result based on the positioning method.

In another embodiment of the present application, the processor is further configured to execute an operation of: calculating the first measurement result and/or the second measurement result based on the positioning method to obtain a positioning result of the first terminal.

In one embodiment, the present application provides a terminal which is a primary positioning terminal, where the primary positioning terminal provides a primary positioning service for a first terminal, and the primary positioning terminal includes: a memory, configured to store a computer program; a processor, configured to read the computer program in the memory; and a transceiver, configured to transceive data under control of a processor; where the processor is further configured to execute operations of: receiving positioning capability information of the first terminal; determining, according to the positioning capability information of the first terminal, a positioning method for positioning measurement of the first terminal, and transmitting the positioning method to the first terminal; receiving a measurement result obtained from measurement, by the first terminal, of a positioning reference signal with a secondary positioning terminal based on the positioning method; and obtaining a positioning result of the first terminal based on the measurement result, and transmitting the positioning result to the first terminal; where the secondary positioning terminal is configured to provide a secondary positioning service.

In another embodiment of the present application, at least two terminals of the first terminal, the primary positioning terminal and the secondary positioning terminal are communicatively connected through a direct communication interface.

In another embodiment of the present application, the processor is further configured to execute operations of: receiving a first measurement result transmitted by the first terminal, where the first measurement result is obtained from measurement, by the first terminal, of a first positioning signal based on the positioning method, and the first positioning signal is transmitted by the secondary positioning terminal to the first terminal; and/or, receiving a second measurement result, where the second measurement result is obtained from measurement, by the secondary positioning terminal, of a second positioning signal based on the positioning method, and the second positioning signal is transmitted by the first terminal to the secondary positioning terminal.

In another embodiment of the present application, before the receiving the positioning capability information of the first terminal, the processor is further configured to execute an operation of transmitting positioning service information to the first terminal through a direct communication interface or a network device.

In another embodiment of the present application, before the receiving the positioning capability information of the first terminal, the processor is further configured to execute operations of receiving a positioning service information acquisition request transmitted by the first terminal; and transmitting positioning service information to the first terminal according to the positioning service information acquisition request.

In another embodiment of the present application, before the receiving the positioning capability information of the first terminal, the processor is further configured to execute an operation of: receiving a first positioning service message, transmitted by the first terminal through a direct communication interface, indicative of providing the primary positioning service; or receiving a first positioning service message, transmitted by a network device, indicative of providing the primary positioning service, where the first positioning service message is transmitted by the first terminal to the network device.

In one embodiment, the present application provides a terminal which is a secondary positioning terminal, where the secondary positioning terminal provides a secondary positioning service for a first terminal, and the secondary positioning terminal includes: a memory, configured to store a computer program; a processor, configured to read the computer program in the memory; and a transceiver, configured to transceive data under control of a processor; where the processor is further configured to execute operations of receiving a positioning method of the first terminal; performing measurement of a positioning reference signal with the first terminal based on the positioning method to obtain a measurement result; and transmitting the measurement result to the first terminal or a primary positioning terminal, where the measurement result is used for the first terminal or the primary positioning terminal to obtain a positioning result of the first terminal, and where the primary positioning terminal is configured to provide a primary positioning service.

In another embodiment of the present application, at least two terminals of the first terminal, the secondary positioning terminal and the primary positioning terminal are communicatively connected through a direct communication interface.

In another embodiment of the present application, if the measurement result includes a first measurement result, the processor is further configured to execute operations of: transmitting a first positioning signal to the first terminal; and receiving the first measurement result transmitted by the first terminal, where the first measurement result is obtained from measurement, by the first terminal, of the first positioning signal based on the positioning method.

In another embodiment of the present application, if the measurement result includes a second measurement result, the processor is further configured to execute operations of: receiving a second positioning signal transmitted by the first terminal; and measuring the second positioning signal based on the positioning method to obtain the second measurement result.

In another embodiment of the present application, before the receiving the positioning method of the first terminal, the processor is further configured to execute an operation of receiving a second positioning service message, transmitted by the first terminal, indicative of providing the secondary positioning service; or, receiving a second positioning service message, transmitted by a network device, indicative of providing the secondary positioning service, where the second positioning service message is transmitted by the first terminal to the network device.

In one embodiment, the present application provides a processor-readable storage medium in which a computer program is stored, where the computer program is configured to enable a processor to execute the positioning method according to the embodiments.

In one embodiment the present application provides a computer program product including a computer program, where the computer program, when being executed by a processor, implements the positioning method according to the embodiments.

In one embodiment, the present application provides a communication system including the first terminal described above, the primary positioning terminal and the secondary positioning terminal described above.

The present application provides a positioning method and apparatus, and a terminal and a storage medium, where the positioning method includes: acquiring acquire positioning service information of a target terminal; determining from the target terminal, according to the positioning service information, a primary positioning terminal for providing a primary positioning service and a secondary positioning terminal for providing a secondary positioning service; and performing positioning for a location of a first terminal based on the primary positioning terminal and the secondary positioning terminal. Since the positioning of the first terminal can be assisted by the primary positioning terminal and the secondary positioning terminal, the location of the first terminal can be accurately positioned even if a network coverage area where the first terminal is located does not have a proper positioning server therein to provide a positioning service.

It will be appreciated that the content described in the above summary part is not intended to limit the embodiments of the present application, nor to limit the scope of the present application. Other features of the present application will become readily comprehensible from the following description.

BRIEF DESCRIPTION OF DRAWINGS

In order to illustrate the embodiments of the present application more clearly, the accompanying drawings used in the description of the embodiments will be briefly described hereunder. Apparently, the drawings in the following description are merely intended for some embodiments of present application.

FIG. 6(*b*) is a schematic diagram of signaling interaction according to an embodiment of the present application when using an uplink (UL) positioning technology for positioning.

FIG. 6(*c*) is a schematic diagram of signaling interaction according to an embodiment of the present application when using an uplink and downlink hybrid positioning technology for positioning.

DESCRIPTION OF EMBODIMENTS

The term "and/or" in the present application is intended to describe an association relationship between associated objects, indicating that there can be three relationships, for example, A and/or B may represent the following cases: A exists alone, both A and B exist, and B exists alone. The character "/" generally indicates that contextually associated objects are in an "or" relationship. In the embodiments of the present application, the term "a plurality of" refers to two or more, and other quantifiers have the similar meaning thereto.

The embodiments of the present application will be clearly and comprehensively described hereunder in conjunction with the accompanying drawings of the embodiments of the present application. Apparently, the described embodiments are merely a part of the embodiments of the present application, rather than all embodiments of the present application.

The embodiments of the present application is applicable to various systems, especially a 5G system. For example, the applicable system may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system or the like. Each of the various systems includes a terminal and a network device. The system further includes a core network part, such as an evolved packet system (EPS), a 5G system (5GS) and the like.

The communication system to which the embodiment of the present application are applicable includes a network device and a terminal. The network device may include an access network device and a core network device. The access network device, for example, can be a radio access network device.

Figure 1:
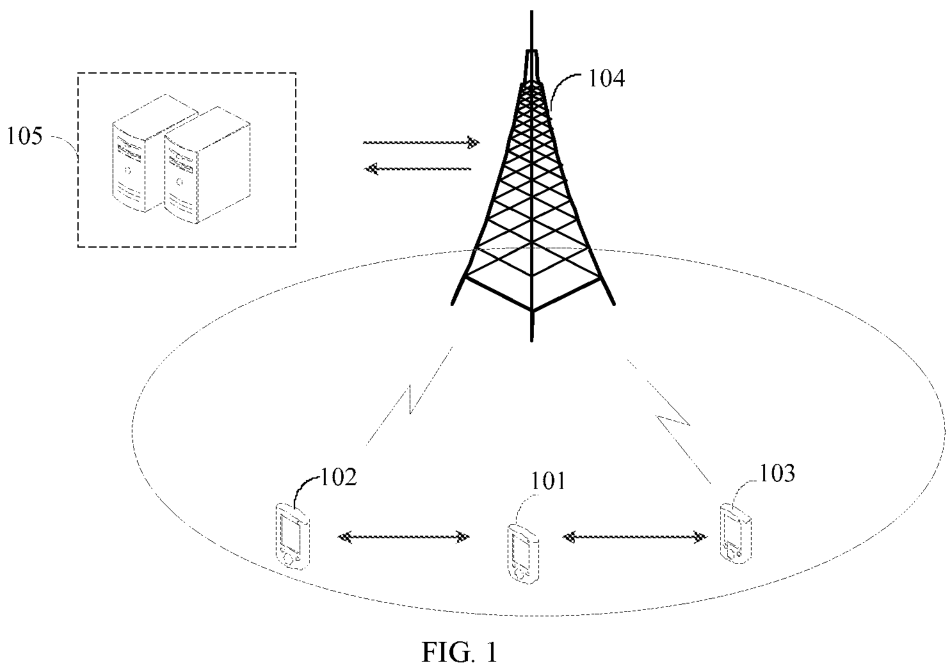
FIG. 1 is a schematic diagram of an application scenario according to an embodiment of the present application.

FIG. 1 is a schematic diagram of an application scenario according to an embodiment of the present application. As shown in FIG. 1, the scenario includes: a first terminal 101, a primary positioning terminal 102, a secondary positioning terminal 103, a network device 104, and a positioning server 105.

It should be noted that the FIG. 1 described above is schematic, and the foregoing scenario may also include other network devices therein, such as a wireless relay device and a wireless backhaul device, etc., which are not shown in FIG. 1. In the embodiment of the present application, each of the first terminal 101, the primary positioning terminal 102, the secondary positioning terminal 103, the network device 104 and the positioning server 105 in the foregoing scenario is exemplarily shown in a singular form, but no limitation is made thereto.

Each of the first terminal 101, the primary positing terminal 102 and the secondary positioning terminal 103 aforementioned may refer to a device providing voice and/or data connectivity to a user, a handheld device with a wireless connection function, or other processing device connected to a wireless modem.

In different systems, the above-described terminals may vary in terms of their names. For example, in the 5G system, the above-described terminals may be termed as user equipment (UE), and the above-described terminals may also be wireless terminals, where a wireless terminal can communicate with one or more core network devices (CN) via a radio access network (RAN). The wireless terminal may be a mobile terminal such as a mobile phone (or termed as a "cellular" phone) and a computer having the mobile terminal, and it may be, for example, a portable, pocket, handheld, computer built-in or vehicle-mounted mobile device exchanging language and/or data with the radio access network, for example, a personal communication service (PCS) phone, a cordless phone, a session initiation protocol (SIP) phone, a wireless local loop (WLL) station, a personal digital assistant (PDA) or other device. The wireless terminal may also be termed as a system, a subscriber unit, a subscriber station, a mobile station, a mobile platform (mobile), a remote station, an access point, a remote terminal, an access terminal, a user terminal, a user agent, or a user device, which is not limited in the embodiments of the present application.

In related arts, the positioning of the first terminal is typically achieved using the network device 104 and the positioning server 105, where the first terminal 101 and the positioning server 105 are within the coverage range of the network device 104. In one embodiment, when performing positioning for the first terminal 101, the first terminal 101 transmits positioning capability information thereof to the positioning server 105 through the network device 104; the positioning server 105, after receiving the positioning capability information of the first terminal, determines a proper positioning method according to the positioning capability information, and transmits the positioning method to the network device 104 and the first terminal 101.

Accordingly, the first terminal 101 and the network device 104 perform positioning measurement according to the positioning method to obtain measurement data, and then transmit the measurement data to the positioning server 105; and finally the positioning server 105 obtains a positioning result of the first terminal 101 from calculation according to the measurement data.

However, the above-described positioning technology relies on the network device 104 and the positioning server 105, and accurate positioning of the first terminal 101 cannot be achieved when a network coverage area where the first terminal 101 is located fails to have a suitable positioning server therein to provide a positioning service, or when the first terminal 101 is not within the network coverage range.

For example, when performing positioning for the first terminal 101, if a corresponding positioning server is not deployed within the network coverage range where the first terminal is located, then at the time when the first terminal 101 transmits a positioning request, no positioning server will respond to the positioning request, and thus the accurate positioning of the first terminal 101 cannot be achieved; or, when a positioning server is deployed within the network coverage range where the first terminal 101 is located, but the positioning server currently has a great data processing burden, if the positioning server is used to position the first terminal 101, the time for the positioning server to respond will be too long due to low data processing efficiency, to degrade the user experience; for another example, when the first terminal 101 is not within the network coverage range of the network device, or is at the edge of the network coverage range (a semi-coverage state), the terminal device cannot make normal positioning measurement with the network device, and hence an accurate positioning result cannot be obtained for the first terminal.

In order to solve the above-mentioned problem, embodiments of the present application provide a positioning method and apparatus, and a terminal and a storage medium. In the positioning method provided in the present application, when a positioning server cannot be used to position a first terminal, the first terminal will acquire positioning service information of a target terminal for providing a positioning service, and then determine from the target terminal, according to the positioning service information of the target terminal, a primary positioning terminal for providing a primary positioning service and a secondary positioning terminal for providing a secondary positioning service, and then perform positioning for a location of the first terminal based on the primary positioning terminal and the secondary positioning terminal.

To be noted that the method and the apparatus provided in the embodiments of the present application are based on the same application conception. Since the problem is solved with similar principles according to the method and the apparatus, cross reference can be made to the apparatus and method embodiments, and repetitions will be omitted.

Figure 2:
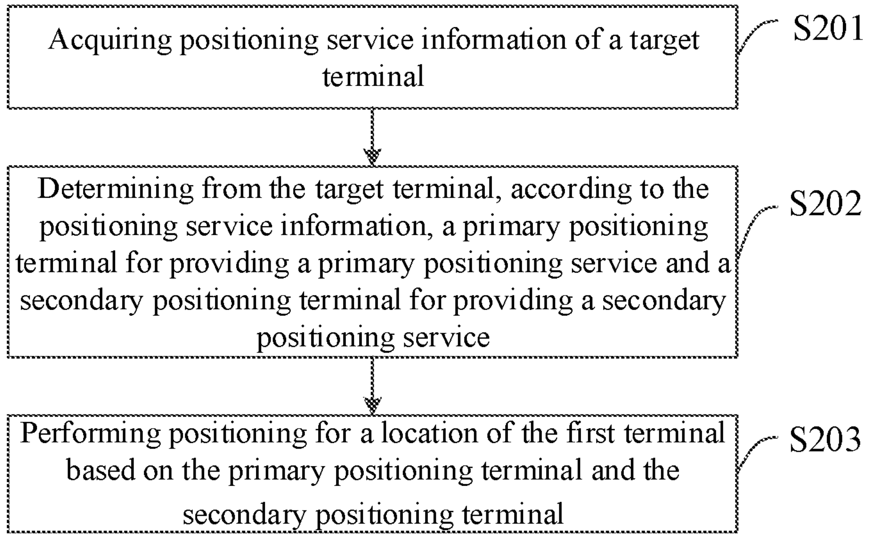
FIG. 2 is a schematic flow diagram of a positioning method according to an embodiment of the present application.

FIG. 2 is a schematic flow diagram of a positioning method according to an embodiment of the present application. As shown in FIG. 2, the execution subject of the positioning method in the present embodiment may be the first terminal aforementioned, the positioning method may include the following steps.

S201: acquiring positioning service information of a target terminal.

The target terminal includes a primary positioning terminal and a secondary positioning terminal. It will be appreciated that the target terminal can be plural or singular, and the primary positioning terminal and the secondary positioning terminal can be the same target terminal or can be different target terminals, which is not limited in the embodiments of the present application.

It should be noted that the positioning service information is used to characterize the type of positioning services that can be provided, where the type of positioning services includes: a primary positioning service and a secondary positioning service. In one embodiment, the primary positioning service is typically to: determine a positioning method before positioning, calculate during the positioning a positioning result according to a measurement result of positioning measurement, and so on; correspondingly, the secondary positioning service is typically to: perform positioning measurement according to the positioning method during the positioning to assist the first terminal to obtain the measurement result, and so on.

In a practical application, at the time of positioning the first terminal, the first terminal will acquire the positioning service information of the target terminal, and a method for acquiring the positioning service information is not limited in the embodiments of the present application. In some embodiments, by means of transmitting identification information, the target terminal may enable the first terminal to obtain the positioning service information of the target terminal. Exemplarily, taking an example where identification information “1” indicates that the type of the positioning service provided by the target terminal is a primary positioning service and identification information “0” indicates that the type of the positioning service provided by the target terminal is a secondary positioning service, at the time of positioning of the first terminal, the first terminal will acquire identification information corresponding to the target terminal, and determine positioning service information of the target terminal according to the acquired identification information. A specific scheme where the first terminal acquires the identification information corresponding to the target terminal will be shown in subsequent embodiments.

S202: determining from the target terminal, according to the positioning service information, a primary positioning terminal for providing a primary positioning service and a secondary positioning terminal for providing a secondary positioning service.

Correspondingly, after receiving the positioning service information transmitted by the target terminal, the first terminal determines, according to the positioning service information, the type of the positioning service that each target terminal can provide, to determine the target terminal as the primary positioning terminal or the secondary positioning terminal according to the type of the positioning service.

An example is also taken based on the foregoing description, after receiving the identification information transmitted by the target terminal, a target terminal with the transmitted identity information “1” is determined to be the primary positioning terminal, and a target terminal with the transmitted identification information “0” is determined to be the secondary positioning terminal.

It should be noted that either the primary positioning terminal or the secondary positioning terminal is at least one in number. In some embodiments, the primary positioning terminal and the secondary positioning terminal may be different terminals; in other embodiments, the primary positioning terminal and the secondary positioning terminal may also be the same terminal, for example, when some target terminals can provide both primary positioning services and secondary positioning services, it is possible that a same target terminal provides both a primary positioning service and a secondary positioning service.

S203: performing positioning for a location of the first terminal based on the primary positioning terminal and the secondary positioning terminal.

In one embodiment, after the primary positioning terminal and the secondary positioning terminal are determined, the primary positioning terminal determines the positioning method for positioning measurement of the first terminal, and the secondary positioning terminal and the first terminal perform the positioning measurement according to the positioning method, and a positioning measurement result is obtained, and finally the location of the first terminal is positioned according to the positioning measurement result.

In this step, the location of the first terminal may be positioned by the first terminal according to the positioning measurement result, or the location of the first terminal may be positioned by the primary positioning terminal according to the positioning measurement result. The present embodiment is shown by taking an example where the first terminal performs positioning for the location of the first terminal according to the positioning measurement result, but is not limited thereto. A specific scheme for positioning the location of the first terminal is specified in subsequent embodiments, which will not be described herein again.

In the positioning method according to the present application, a first terminal acquires positioning service information of a target terminal, determines from the target terminal, according to the positioning service information, a primary positioning terminal for providing a primary positioning service and a secondary positioning terminal for providing a secondary positioning service, and performs positioning for a location of the first terminal based on the primary positioning terminal and the secondary positioning terminal. Since the positioning of the first terminal can be assisted by the primary positioning terminal and the secondary positioning terminal, the location of the first terminal can be accurately positioned even if a network coverage area where the first terminal is located does not have a proper positioning server therein to provide a positioning service.

In some scenarios, there may be target terminals for providing primary positioning services, however, only one primary positioning terminal is often required for positioning of the first terminal. Therefore, it is necessary to determine, from the target terminals, a primary positioning terminal for providing a primary positioning service. In a practical application, there are various ways to determine the primary positioning terminal, which are not limited in the embodiments of the present application. On one hand, the primary positioning terminal for providing the primary positioning service for the first terminal can be randomly determined from target terminals for providing the primary positioning services. On the other hand, the primary positioning terminal for providing the primary positioning service can also be determined from the target terminals for providing the primary positioning services, according to positioning performance of the terminal. The positioning performance includes: positioning capability, a movement speed, and a channel condition between the terminal and the first terminal. In one embodiment, Step S202 in the foregoing embodiment may include the following steps:

(1) determining from the target terminal, according to the positioning service information, at least one terminal for providing the primary positioning service; and (2) screening from the determined at least one terminal, according to positioning capability information of each determined terminal, a movement speed and a channel condition between the terminal and the first terminal, the primary positioning terminal for providing the primary positioning service.

Exemplarily, it can be determined from the positioning capability information of the target terminal that a terminal having positioning capability matched with positioning capability of the first terminal is the primary positioning terminal. For example, if the first terminal supports an NR downlink positioning technology, a terminal supporting the NR downlink positioning technology is determined as the primary positioning terminal, from at least one terminal for providing the primary positioning service; in one embodiment, a terminal with a lowest movement speed can be determined as the primary positioning terminal; in one embodiment, a terminal having a best channel condition with the first terminal can be determined as the primary positioning terminal.

In a practical application, a communication mode between the first terminal and the target terminal is not limited in the embodiments of the present application. Exemplarily, the first terminal may establish a communication connection with the target terminal through a direct communication interface (Sidelink), or through a network device. The network device can be a base station.

On this basis, the target terminal may transmit the positioning service information to the first terminal through the direct communication interface, or transmit the positioning service information to the first terminal through the network device; two specific implementations of the above-described Step S201 will be described hereunder in conjunction with FIG. 3 and FIG. 4, respectively.

Figure 3:
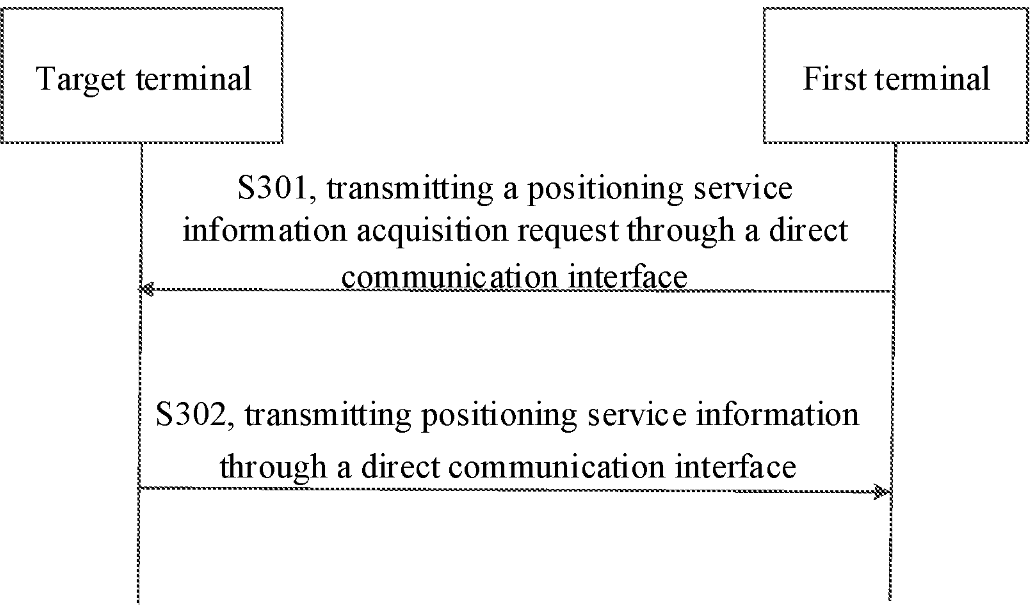
FIG. 3 is a schematic diagram of signaling interaction of a positioning method according to an embodiment of the present application.

FIG. 3 is a schematic diagram of signaling interaction of a positioning method according to an embodiment of the present application. As shown in FIG. 3, the method provided in the present embodiment can include the following steps.

S301: the first terminal transmits a positioning service information acquisition request to the target terminal through a direct communication interface.

S302: the target terminal transmits positioning service information to the first terminal through a direct communication interface.

Correspondingly, the first terminal receives, through the direct communication interface, the positioning service information transmitted by the target terminal.

It should be noted that there are various ways for the transmission or the reception of the positioning service information through the direct communication interface between the first terminal and the target terminal, which are not limited in the embodiments of the present application. On one hand, the communication therebetween can be achieved by means of transmitting a broadcast message. Then, the present scheme allows the first terminal to transmit, through the direct communication interface, a broadcast message carrying the positioning service information acquisition request; accordingly, the target terminal within a range of direct communication, after receiving the broadcast message, transmits the positioning service information of the target terminal to the first terminal according to the positioning service information acquisition request in the broadcast message. Through this scheme, the first terminal can maximize the discovery of surrounding target terminals for providing positioning services, to increase a success rate of positioning the first terminal.

On the other hand, the communication therebetween can also be achieved by means of transmitting a dedicated message. It will be appreciated that a specific scheme for use with the dedicated message is similar to the above-described scheme for use with the broadcast message, which will not be described here again.

In the positioning method according to the present application, the first terminal transmits a positioning service information acquisition request to the target terminal through a direct communication interface; the target terminal transmits positioning service information to the first terminal; and the first terminal receives the positioning service information transmitted by the target terminal. By means of transmitting data through the direct communication interface, efficiency of data transmission can be improved and thus efficiency of positioning is improved.

In some scenarios, the target terminal may also actively transmit positioning service information to the first terminal. For example, some target terminals with a positioning function can transmit, in real time, broadcast messages carrying positioning service information, and the broadcast messages can be received when there is a need to perform positioning for the first terminal, and the positioning service information of the target terminals is obtained to achieve positioning. That is, in the scheme according to the present embodiment, if the target terminal has a function of actively transmitting a broadcast message, proceed with direct execution of the above-described Step S302 in the present embodiment; if the target terminal does not have a function of actively transmitting a broadcast message, the first terminal needs to transmit a positioning service information acquisition request to obtain the positioning service information of the target terminal, that is, it is necessary to proceed with the execution of the above-described Steps S301~S302 in the present embodiment.

In a practical application, when the first terminal does not have a direct communication interface, or the target terminal does not have a direct communication interface, the first terminal can also acquire the positioning service information of the target terminal through a network device. FIG. 4 is a schematic diagram of signaling interaction of a positioning method according to another embodiment of the present application. As shown in FIG. 4, the method provided in the present embodiment may include the following steps.

S401: the first terminal transmits a positioning service information acquisition request to the network device.

The first terminal is located within a coverage range of the network device.

S402: the network device transmits positioning service information of a target terminal to the first terminal.

Correspondingly, the first terminal receives the positioning service information of the target terminal transmitted by the network device.

It should be noted that there are various ways for communications between the first terminal and the network device, which are not limited in the embodiments of the present application. On one hand, the communications therebetween can be achieved by means of transmitting a broadcast message; on the other hand, the communications therebetween can also be achieved by means of transmitting a dedicated message. It will be appreciated that the scheme provided in the present embodiment is similar to the above-described scheme in connection with the communications between the first terminal and the target terminal, which will not be described here again.

Similarly, the network device may also actively transmit a broadcast message carrying the positioning service information of the target terminal to the first terminal. When the first terminal needs to be positioned, the first terminal will receive the broadcast message, and the positioning service information of the target terminal is obtained to achieve positioning. That is, in the present scheme, if the network device can actively transmit a broadcast message to the first terminal, proceed with direct execution of the above-described Step S402 in the present embodiment; if the network device cannot actively transmit a broadcast message, the first terminal needs to transmit a positioning service information acquisition request to obtain the positioning service information of the target terminal, that is, it is necessary to proceed with execution of the above-described Steps S401~S402 in the present embodiment.

In other scenarios, if the first terminal does not have a direct communication interface or the target terminal does not have a direct communication interface, and the first terminal is out of a coverage range of the network device, the positioning service information of the target terminal can also be acquired from a storage medium of the first terminal.

In one embodiment, if it is determined that the first terminal is out of a coverage range of the network device, acquire the positioning service information of the target terminal from a storage medium of the first terminal; where the positioning service information of the target terminal is acquired and stored from the network device under a circumstance that the first terminal is within the coverage range of the network device.

In the embodiment of the present application, the first terminal can obtain the positioning service information of the target terminal in a variety of ways, and positioning requirements are met for different scenarios, to improve flexibility of the positioning method, and then improving the positioning effect of the first terminal.

Figure 5:
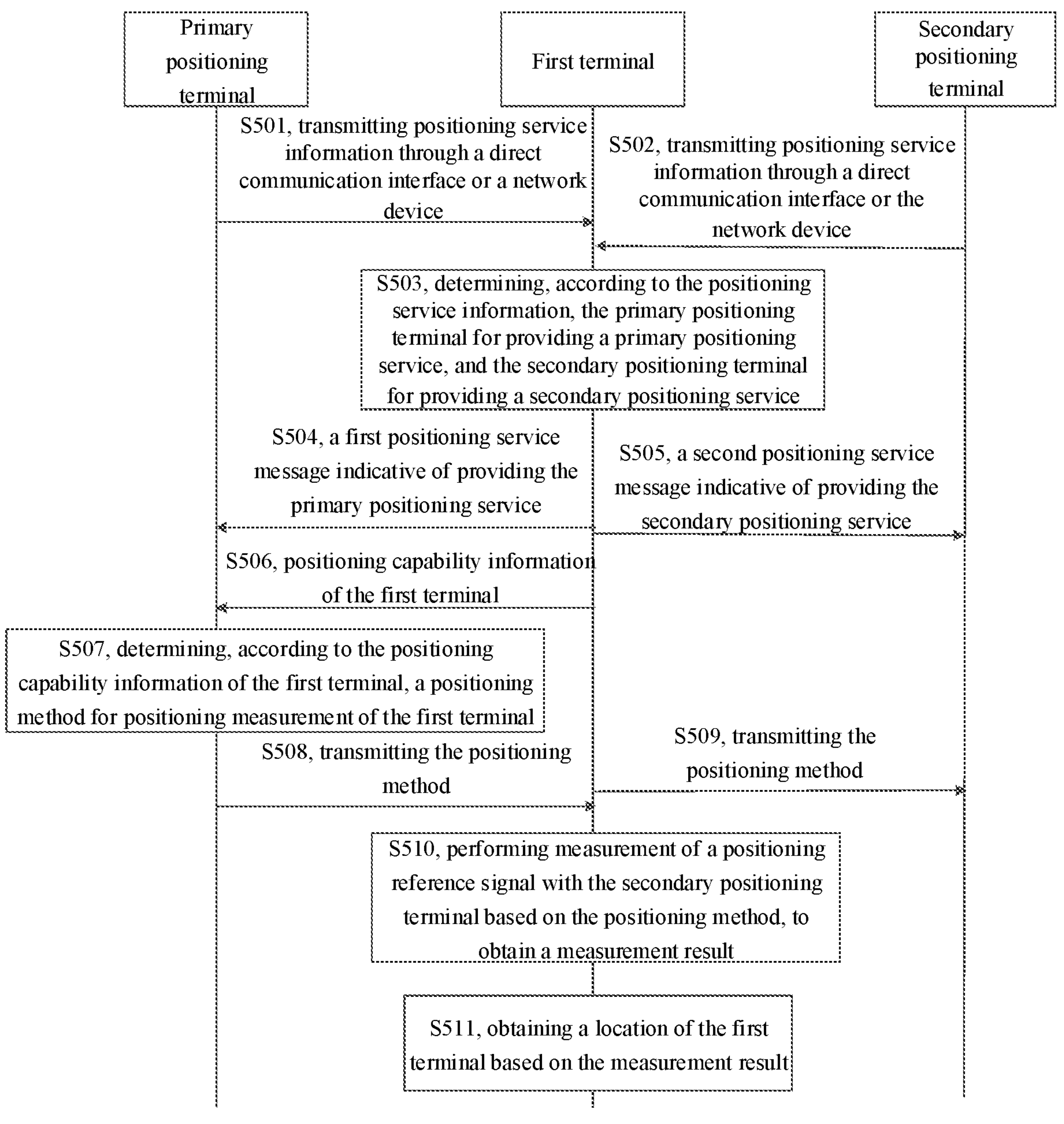
FIG. 5 is a schematic diagram of signaling interaction a positioning method according to yet another embodiment of the present application.

FIG. 5 is a schematic diagram of signaling interaction a positioning method according to yet another embodiment of the present application. As shown in FIG. 5, the method in the present embodiment includes the following steps.

S501: a primary positioning terminal transmits positioning service information to a first terminal through a direct communication interface or a network device.

S502: the secondary positioning terminal transmits positioning service information to the first terminal through a direct communication interface or the network device.

S503: determining, according to the positioning service information, the primary positioning terminal for providing a primary positioning service, and the secondary positioning terminal for providing a secondary positioning service.

Figure 4:
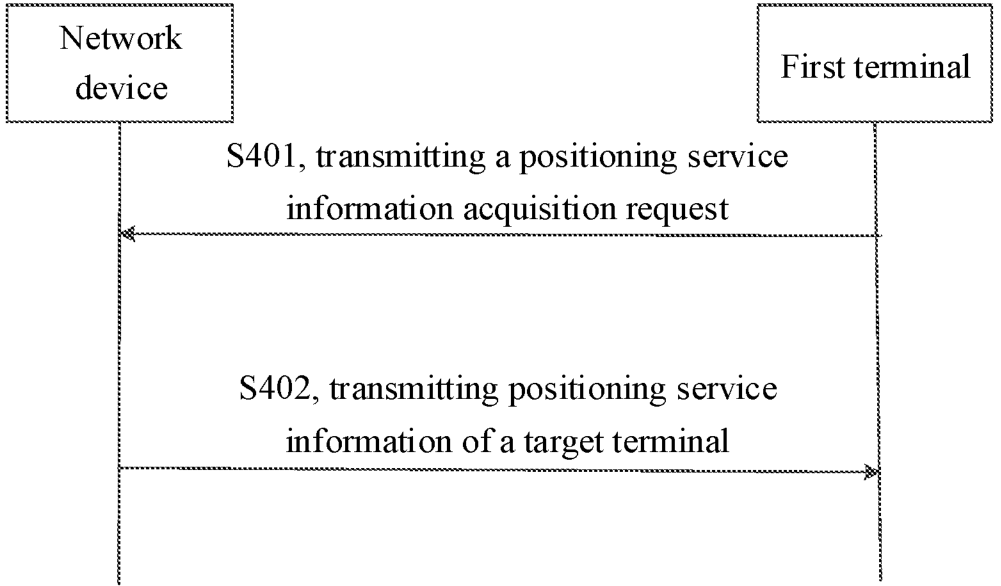
FIG. 4 is a schematic diagram of signaling interaction of a positioning method according to another embodiment of the present application.

For the implementation process of S501~S503, reference can be made to the description of the foregoing embodiments shown in FIG. 3 and FIG. 4, and will not be described here again. Further, the execution sequence of the above-described Steps S501 and S502 is not limited in the embodiments of the present application.

S504: the first terminal transmits, to the primary positioning terminal, a first positioning service message indicative of providing the primary positioning service.

In some embodiments, the first positioning service message indicative of providing the primary positioning service may also be transmitted to the network device in this step, and the network device, upon reception of the first positioning service message, forwards the first positioning service message to the primary positioning terminal.

S505: the first terminal transmits, to the secondary positioning terminal, a second positioning service message indicative of providing the secondary positioning service.

Similarly, in this step, the second positioning service message indicative of providing the secondary positioning service may also be transmitted to the network device, and the network device, upon reception of the second positioning service message, forwards the second positioning service message to the secondary positioning terminal.

It should be noted that the execution sequence of the above-described Steps S504 and S505 is not limited in the embodiments of the present application.

S506: the first terminal transmits positioning capability information of the first terminal to the primary positioning terminal.

The positioning capability information is used to determine the positioning method, and the positioning capability information includes at least one of the following: positioning capability for a positioning method supported by the first terminal, positioning capability for an assisted data type supported by a particular positioning method (e.g., a data type applicable to a network enhancement system (A-GNSS) supported by the first terminal), and positioning capability for different positioning methods (e.g., the capability of the first terminal to process positioning transactions). In a practical application, the first terminal can transmit the positioning capability information to the primary positioning terminal by means of transmitting an LTE positioning protocol (LPP) of the first terminal.

It should be noted that the method according to which the first terminal transmits the positioning capability information to the primary positioning terminal is not limited in the embodiments of the present application. On one hand, the positioning capability information may be transmitted to the primary positioning terminal by means of a method for a broadcast message or a dedicated message; on the other hand, the positioning capability information can also be transmitted to the primary positioning terminal by means of forwarding by the network device, and a specific scheme for transmitting the positioning capability information is the same as the scheme and principle in the foregoing embodiments for acquiring the positioning service information, which will not be described here again.

S507: the primary positioning terminal determines, according to the positioning capability information of the first terminal, a positioning method for positioning measurement of the first terminal.

The positioning method for positioning measurement of the first terminal may include at least one of the following: an NR downlink positioning technology (such as the technology in connection with downlink-time difference of arrival (DL-TDOA) and downlink-angle of departure (DL-AOD)), an uplink positioning technology (such as the technology in connection with uplink-time difference of arrival (UL-TDOA) and uplink-angle of arrival technology (UL-AOA)), as well as an uplink and downlink hybrid positioning technology (such as the technology in connection with Multi-round trip time(Multi-RTT)), etc.

In this step, after receiving the positioning capability information of the first terminal, the primary positioning terminal determines, according to the positioning capability information of the first terminal, the positioning method for measurement of the first terminal.

In one embodiment, the positioning method for measurement of the first terminal can be determined according to the positioning method, supported by the first terminal indicated, in the positioning capability information of the first terminal. Exemplarily, if the positioning capability information of the first terminal indicates that the positioning method supported by the first terminal is the Multi-RTT technology, it can be determined that the positioning method for positioning measurement of the first terminal is the Multi-RTT technology.

It should be noted that when there are positioning methods supported by the first terminal, on one hand, a positioning method can be randomly determined from the positioning methods; on the other hand, the positioning method can also be determined according to the capability, in the positioning capability information, for the first terminal to handle positioning transactions. Exemplarily, if the capability of the first terminal when using the Multi-RTT technology is superior over other positioning methods, it can be determined that the positioning method for positioning measurement of the first terminal is the Multi-RTT technology. Understandably, the aforementioned methods are exemplary, and the present embodiment is not limited thereto.

S508: the primary positioning terminal transmits the positioning method to the first terminal.

S509: the primary positioning terminal transmits the positioning method to the secondary positioning terminal.

It should be noted that the execution sequence of the above-described steps S508 and S509 is not limited in the embodiments of the present application. For the manner in which the primary positioning terminal transmits the positioning method to the first terminal and the secondary positioning terminal, reference may be made to the manner in the foregoing embodiments where the target terminal and the first terminal perform data communication, and details will not be described here again.

In some real scenarios, for example, when the primary positioning terminal and the secondary positioning terminal cannot communicate, the positioning method can also be transmitted by the first terminal to the secondary positioning terminal, that is, after the first terminal receives the positioning method, it forwards the same to the secondary positioning terminal. With the present embodiment, positioning requirements can be met for different scenarios, and the flexibility of the present scheme is improved.

S510: the first terminal performs measurement of a positioning reference signal with the secondary positioning terminal based on the positioning method, to obtain a measurement result.

It should be noted that, for different positioning methods, different measurement results are obtained, and methods for obtaining a location of the first terminal are also different. In one embodiment, the measurement result may include: a first measurement result and/or a second measurement result, where the first measurement result is obtained from interaction by the first terminal with the secondary positioning terminal according to the positioning method, and the second measurement result is obtained from interaction by the secondary positioning terminal with the first terminal according to the positioning method.

Exemplarily, when a downlink positioning method is adopted, the secondary positioning terminal transmits a positioning reference signal, and the first terminal performs measurement of the positioning reference signal to obtain a first measurement result, and then obtains the location of the first terminal according to the first measurement result; when an uplink positioning method is adopted, the first terminal transmits a positioning reference signal, the secondary positioning terminal obtains a second measurement result according to the positioning reference signal, and then the location of the first terminal is obtained according to the second measurement result; when the uplink and downlink hybrid positioning technology is adopted, the secondary positioning terminal transmits a positioning reference signal, the first terminal obtains a first measurement result, the first terminal transmits a positioning reference signal, the secondary positioning terminal obtains a second measurement result, and then the location of the first terminal is obtained according to the first measurement result and the second measurement result. A specific interaction mode of each of the above-described methods is shown in subsequent embodiments.

S511: the first terminal obtains the location of the first terminal based on the measurement result.

In some scenarios, the location of the first terminal may also be obtained by the primary positioning terminal based on a measurement result, and a specific implementation is shown in subsequent embodiments.

In a practical application, the secondary positioning terminal and the primary positioning terminal can be the same terminal or different terminals. For example, when some target terminals can provide both primary positioning services and secondary positioning services, it is possible that a same target terminal provides both a primary positioning service and a secondary positioning service.

In the present embodiment, if the secondary positioning terminal and the primary positioning terminal are the same terminal, an embodiment of the present application may include the following steps:

(1) the first terminal transmits positioning capability information of the first terminal to the primary positioning terminal;

(2) the primary positioning terminal receives the positioning capability information of the first terminal, and determines, according to the positioning capability information of the first terminal, the positioning method for positioning measurement, and transmits the positioning method to the first terminal;

(3) the first terminal performs measurement of a positioning reference signal with the primary positioning terminal based on the positioning method to obtain a measurement result; and (4) the first terminal obtains the location of the first terminal based on the measurement result.

Understandably, the method and principle according to which the primary positioning terminal is used to provide the secondary positioning service is similar to the method and principle according to which the secondary positioning terminal is used to provide the secondary positioning service. Reference can be made to the foregoing embodiments for details, which will not be described here again. In the present scheme, the secondary positioning service is performed by the primary positioning terminal, and when the target terminal is limited in number and there is no proper secondary positioning terminal to provide the secondary positioning service, accurate positioning of the first terminal can also be obtained, to improve the flexibility of the present scheme and improving the user experience. In addition, the use of only the primary positioning terminal can reduce data interaction and thus improve positioning efficiency.

In conjunction with FIG. 6(*a*) to FIG. 6(*c*), more detailed explanations will be made hereunder to the positioning process of the above-described Step S511 based on different positioning methods.

Figure 6A:
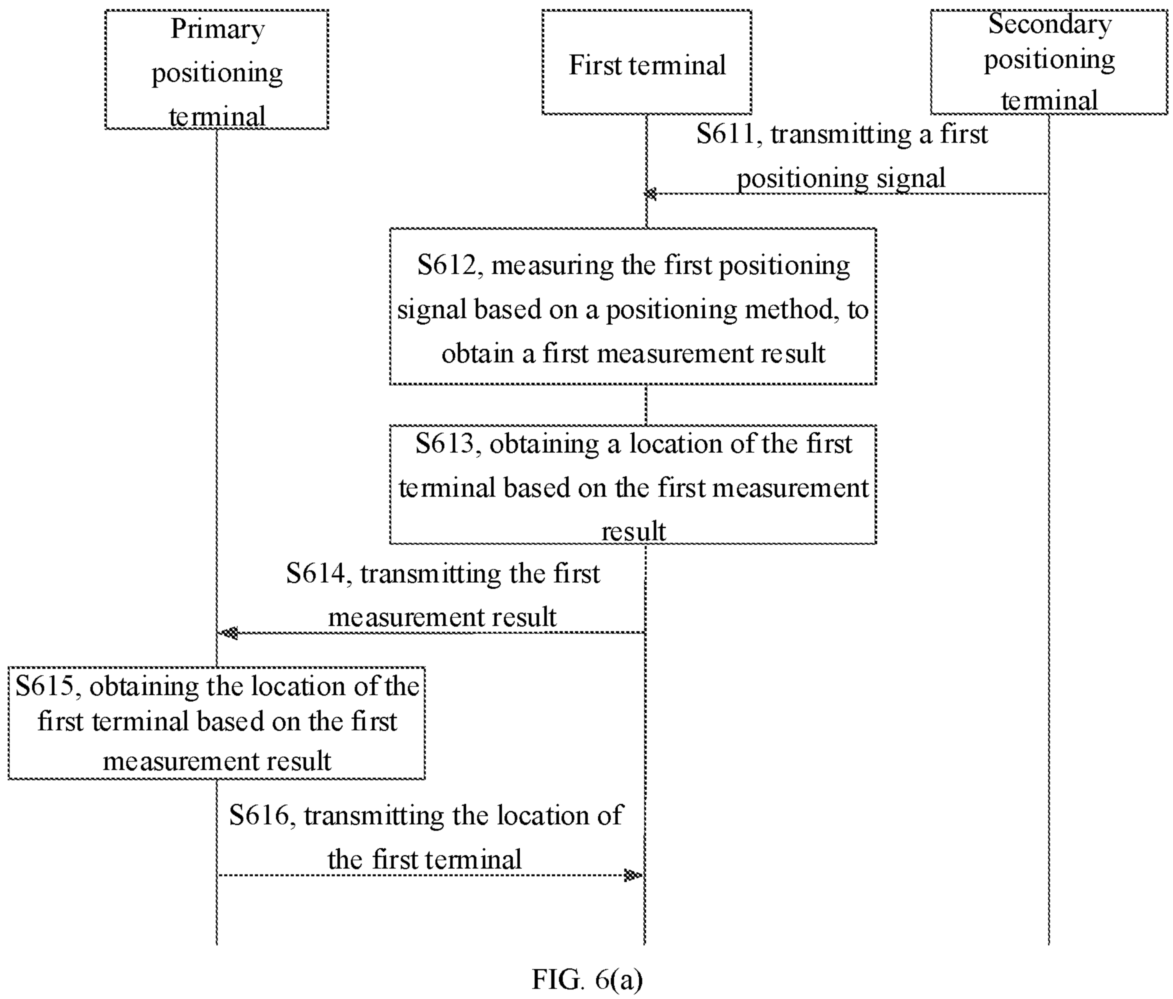
FIG. 6(*a*) is a schematic diagram of signaling interaction according to an embodiment of the present application when using a downlink (DL) positioning technology for positioning.
Figure 6B:
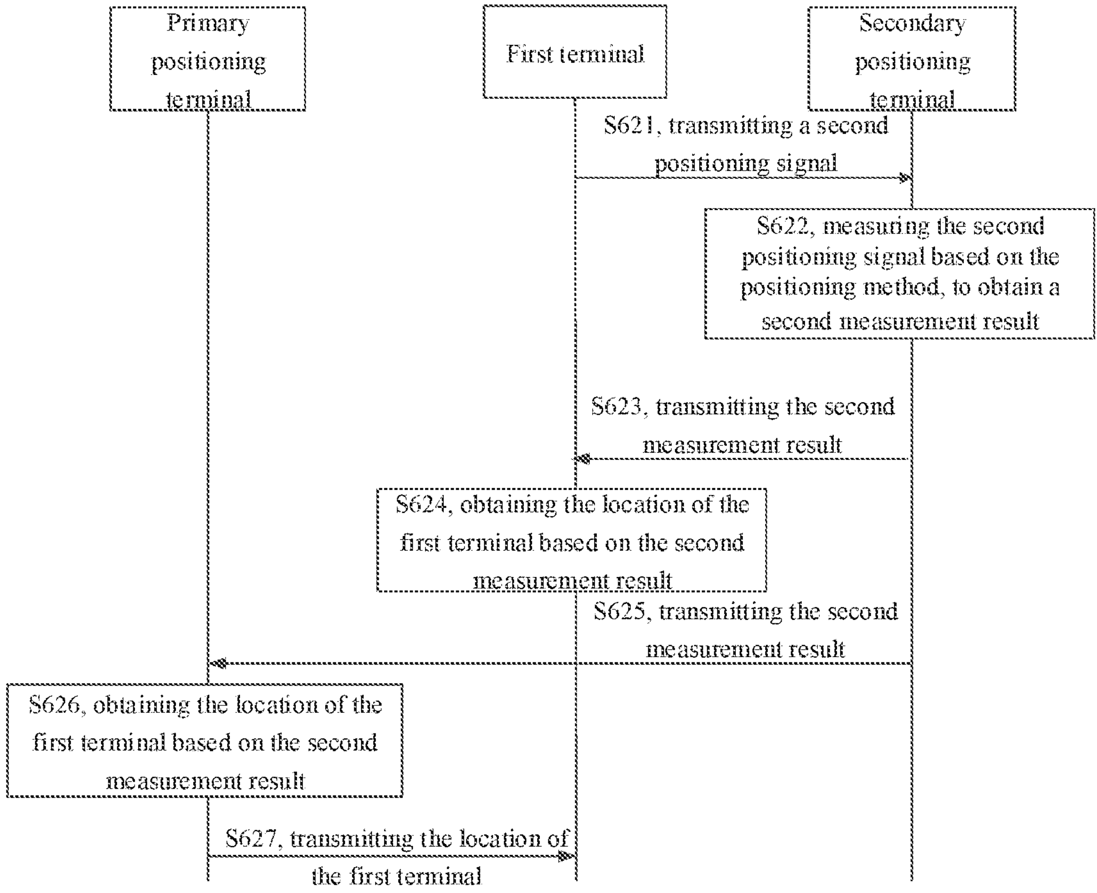
Figure 6C:
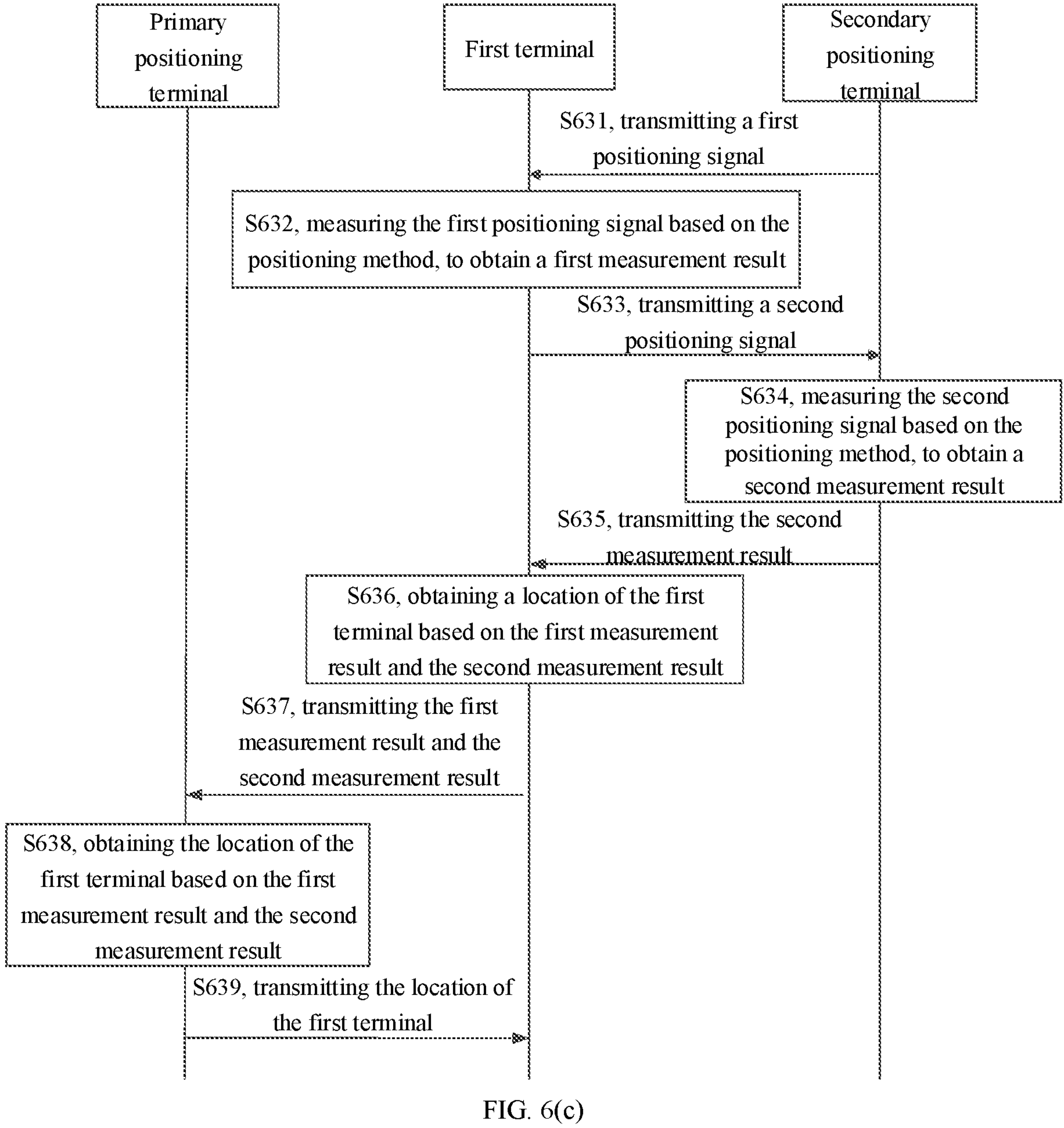

FIG. 6(*a*) is a schematic diagram of signaling interaction according to an embodiment of the present application when using a downlink positioning technology for positioning. The method provided in the embodiment of the present application is applied to the downlink positioning technology, as shown in FIG. 6(*a*), the present scheme includes the following steps.

S611: a secondary positioning terminal transmits a first positioning signal to a first terminal.

S612: the first terminal measures the first positioning signal based on a positioning method, to obtain a first measurement result.

Detailed explanations are made hereunder to the present scheme by taking an example where the downlink positioning technology includes a DL-TDOA technology and a DL-AOD technology. It will be appreciated that the downlink positioning technology provided in the present embodiment is only exemplary and is not limited in a practical application.

In the present scheme, when the DL-TDOA technology is adopted, the secondary positioning terminal transmits a downlink positioning reference signal (PRS) to the first terminal, that is, the first positioning signal; the first terminal measures the downlink PRS to obtain a reference signal time difference (RSTD) measurement result, that is, the first measurement result.

When the DL-AOD technology is adopted, the secondary positioning terminal transmits a downlink PRS to the first terminal, that is, the first positioning signal; the first terminal measures the downlink PRS to obtain a reference signal received power (RSRP) measurement result, that is, the first measurement result.

Appreciatively, the scheme in the existing technology can be used for the method for use with the above-described two uplink positioning technologies according to which the first positioning signal is measured to obtain the first measurement result, which will not be described here again.

S613: the first terminal obtains a location of the first terminal based on the first measurement result.

S614: the first terminal transmits the first measurement result to a primary positioning terminal.

S615: the primary positioning terminal obtains the location of the first terminal based on the first measurement result.

S616: the primary positioning terminal transmits the location of the first terminal to the first terminal.

In a practical application, there are various ways to calculate the location of the first terminal, which are not limited in the embodiments of the present application. On one hand, when the first terminal does not have computing power, the location of the first terminal may be calculated by the primary positioning terminal, that is, in the present embodiment, after obtaining the first measurement result, execution of the above-described Steps S614~S616 is needed. On the other hand, when the first terminal has computing power, the location of the first terminal may be calculated by the first terminal, that is, in the present embodiment, after obtaining the first measurement result, execution of only the above-described Step S613 is needed.

With the above-described scheme, various types of positioning requirements of the first terminal can be met and user experience is improved. In addition, when a positioning result is directly calculated by the first terminal, the positioning efficiency can be improved, since there is no need for the first terminal to forward a first measurement result to the primary positioning terminal and there is no need for the primary positioning terminal to forward the positioning result to the first terminal.

It should be noted that, in the present embodiment, the communication mode among the secondary positioning terminal, the primary positioning terminal and the first terminal is similar to the communication mode provided in the foregoing embodiments, that is, if each of the secondary positioning terminal and the primary positioning terminal has a direct communication interface, they two can communicate through the direct communication interface; if either one of the secondary positioning terminal and the primary positioning terminal does not have a direct communication interface, they two can communicate through a network device. Exemplarily, the secondary positioning terminal can transmit the first positioning signal to the first terminal through a direct communication interface or a network device; it will be appreciated that the communication mode between the primary positioning terminal and the first terminal is similar to that in the above description, and will not be described here again. Exemplarily, the first terminal can transmit the first measurement result to the primary positioning terminal through a direct communication interface or a network device.

FIG. 6(*b*) is a schematic diagram of signaling interaction according to an embodiment of the present application when using an uplink positioning technology for positioning. The method provided in the embodiment of the present application is applied to the uplink positioning technology. As shown in FIG. 6(*b*), the present scheme includes the following steps.

S621: a first terminal transmits a second positioning signal to a secondary positioning terminal.

S622: the secondary positioning terminal performs measurement according to the second positioning signal, to obtain a second measurement result.

S623: the secondary positioning terminal transmits the second measurement result to the first terminal.

Detailed explanations are made hereunder to the present scheme by taking an example where the uplink positioning technology includes a UL-TDOA technology and a UL-AOA technology. It will be appreciated that the uplink positioning technology provided in the present embodiment is only exemplary and is not limited in a practical application.

In the present embodiment, when the UL-TDOA technology is adopted, the first terminal transmits a UL sounding reference signal (SRS) to the secondary positioning terminal, that is, the second positioning signal; the secondary positioning terminal measures the UL SRS to obtain a relative time of arrival (RTOA) measurement result, that is, the second measurement result.

When the UL-AOD technology is adopted, the first terminal transmits a UL SRS to the secondary positioning terminal, that is, the second positioning signal; the secondary positioning terminal measures the UL SRS to obtain a measurement result of an azimuth angle of arrival A-AOA and a zenith angle of arrival Z-AOA, that is, the second measurement result.

Appreciatively, when using the above-described two uplink positioning technologies, the scheme in the existing technology can be used for the method according to which the second positioning signal is measured to obtain the second measurement result, and details will be omitted here.

S624: the first terminal obtains a location of the first terminal based on the second measurement result.

S625: the secondary positioning terminal transmits the second measurement result to a primary positioning terminal.

S626: the primary positioning terminal obtains the location of the first terminal based on the second measurement result.

S627: the primary positioning terminal transmits the location of the first terminal to the first terminal.

In a practical application, there are various ways to calculate the location of the first terminal, which are not limited in the embodiments of the present application. On one hand, when the first terminal does not have computing power, the location of the first terminal may be calculated by the primary positioning terminal, that is, in the present embodiment, after obtaining the second measurement result, execution of only the above-described Step S624 is needed. On the other hand, when the first terminal has computing power, the location of the first terminal may be calculated by the first terminal, that is, in the present embodiment, execution of the above-described Steps S625~S627 is needed.

With the present scheme, various types of positioning requirements of the first terminal can be met and user experience is improved. In addition, when a positioning result is directly calculated by the first terminal, the positioning efficiency can be improved, since there is no need for the secondary positioning terminal to forward a second measurement result to the primary positioning terminal and there is no need for the primary positioning terminal to forward the positioning result to the first terminal.

FIG. 6(*c*) is a schematic diagram of signaling interaction according to an embodiment of the present application when using an uplink and downlink hybrid positioning technology for positioning. The method provided in the embodiment of the present application is applied to the uplink and downlink hybrid positioning technology. As shown in FIG. 6 (*c*), the present scheme includes the following steps.

S631: a secondary positioning terminal transmits a first positioning signal to a first terminal.

S632: the first terminal measures the first positioning signal based on the positioning method, to obtain a first measurement result.

S633: the first terminal transmits a second positioning signal to the secondary positioning terminal.

S634: the secondary positioning terminal performs measurement according to the second positioning signal, to obtain a second measurement result.

S635: the secondary positioning terminal transmits the second measurement result to the first terminal.

It should be noted that Steps S631~S635 in the present embodiment are similar to the positioning method provided in FIG. 6(*a*) and FIG. 6(*b*); reference can be made to the above description for details, which will not be described here again. In addition, for the execution sequence of the above-described steps, no specific limitation is made in the embodiments of the present application.

S636: the first terminal obtains a location of the first terminal based on the first measurement result and the second measurement result.

S637: the first terminal transmits the first measurement result and the second measurement result to a primary positioning terminal.

S638: the primary positioning terminal obtains the location of the first terminal based on the first measurement result and the second measurement result.

S639: the primary positioning terminal transmits the location of the first terminal to the first terminal.

Similarly, in the present embodiment, there are various ways to calculate the location of the first terminal, which are not limited in the embodiments of the present application. On one hand, when the first terminal does not have computing power, the location of the first terminal may be calculated by the primary positioning terminal, that is, in the present embodiment, execution of the above-described Steps S631~S635 and S637~S639 is needed. On the other hand, when the first terminal has computing power, the location of the first terminal may be calculated by the first terminal, that is, in the present embodiment, execution of only the above-described Steps S631~S636 is needed. With the present scheme, positioning requirements of the first terminal equipped without positioning computing power can be met, and thus the flexibility of the present scheme is improved, and meanwhile user experience is improved. In addition, when a positioning result is directly calculated by the first terminal, the positioning efficiency can be improved, since there is no need for the secondary positioning terminal and the first terminal to forward a measurement result to the primary positioning terminal and there is no need for the primary positioning terminal to forward the positioning result to the first terminal.

Figure 7:
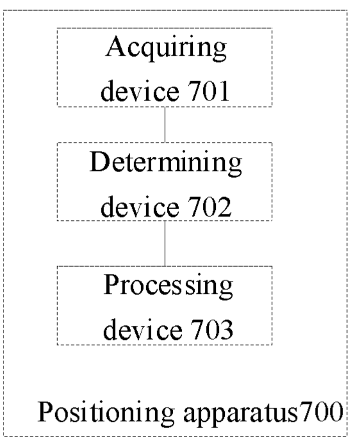
FIG. 7 is a schematic structural diagram of a positioning apparatus according to an embodiment of the present application.

On the first terminal side, an embodiment of the present application provides a positioning apparatus, applied to a first terminal. FIG. 7 is a schematic structural diagram of a positioning apparatus according to an embodiment of the present application. As shown in the figure, the positioning apparatus 700 includes:

an acquiring device 701, configured to acquire positioning service information of a target terminal;

a determining device 702, configured to determine from the target terminal, according to the positioning service information, a primary positioning terminal for providing a primary positioning service and a secondary positioning terminal for providing a secondary positioning service; and a processing device 703, configured to perform positioning for a location of the first terminal based on the primary positioning terminal and the secondary positioning terminal.

In another embodiment of the present application, the first terminal establishes communicative connection with the target terminal through a direct communication interface.

In another embodiment of the present application, the acquiring device 701 is configured to: receive, through a direct communication interface, the positioning service information transmitted by the target terminal.

In another embodiment of the present application, the acquiring device 701 is configured to: transmit a positioning service information acquisition request to the target terminal through a direct communication interface; and receive the positioning service information transmitted by the target terminal.

In another embodiment of the present application, the acquiring device 701 is configured to: acquire the positioning service information of the target terminal from a network device.

In another embodiment of the present application, the acquiring device 701 is configured to: transmit a positioning service information acquisition request to the network device, where the first terminal is located within a coverage range of the network device; and receive the positioning service information of the target terminal transmitted by the network device.

In another embodiment of the present application, the acquiring device 701 is configured to: acquire the positioning service information of the target terminal from a storage medium of the first terminal if it is determined that the first terminal is out of a coverage range of the network device, where the positioning service information of the target terminal is acquired and stored from the network device under a circumstance that the first terminal is within the coverage range of the network device.

In another embodiment of the present application, the determining device 702 is configured to: determine from the target terminal, according to the positioning service information, at least one terminal for providing the primary positioning service; and screen from the determined at least one terminal, according to positioning capability information of each determined terminal, a movement speed and a channel condition between the terminal and the first terminal, the primary positioning terminal for providing the primary positioning service.

In another embodiment of the present application, the positioning apparatus further includes: a transmitting device (not shown), configured to transmit, to the primary positioning terminal, a first positioning service message indicative of providing the primary positioning service; or transmit, to a network device, a first positioning service message indicative of providing the primary positioning service, and the network device, upon reception of the first positioning service message, forwards the first positioning service message to the primary positioning terminal.

In another embodiment of the present application, the transmitting device is further configured to: transmit, to the secondary positioning terminal, a second positioning service message indicative of providing the secondary positioning service; or transmit, to a network device, a second positioning service message indicative of providing the secondary positioning service, and the network device, upon reception of the second positioning service message, forwards the second positioning service message to the secondary positioning terminal.

In another embodiment of the present application, the processing device 703 is configured to: transmit positioning capability information of the first terminal to the primary positioning terminal; receive a positioning method for positioning measurement of the first terminal determined by the primary positioning terminal according to the positioning capability information; perform measurement of a positioning reference signal with the secondary positioning terminal based on the positioning method to obtain a measurement result; and obtain the location of the first terminal based on the measurement result.

In another embodiment of the present application, if the measurement result includes a first measurement result, the processing device 703 is configured to: receive a first positioning signal transmitted by the secondary positioning terminal; and measure the first positioning signal based on the positioning method to obtain the first measurement result.

In another embodiment of the present application, if the measurement result includes a second measurement result, the processing device 703 is configured to: transmit a second positioning signal to the secondary positioning terminal; and receive the second measurement result, where the second measurement result is obtained from measurement, by the secondary positioning terminal, of the second positioning signal based on the positioning method.

In another embodiment of the present application, the processing device 703 is configured to: transmit the first measurement result and/or the second measurement result to the primary positioning terminal; receive a positioning result transmitted by the primary positioning terminal, and obtain the location of the first terminal according to the positioning result, where the positioning result is obtained from calculation, by the primary positioning terminal, of the first measurement result and/or the second measurement result based on the positioning method.

In another embodiment of the present application, the processing device 703 is configured to: calculate the first measurement result and/or the second measurement result based on the positioning method to obtain a positioning result of the first terminal.

To be noted here, the above-described apparatus provided in the present application can implement all the method steps achieved by the first terminal in the foregoing method embodiments, and can achieve the same effect. For the same part and beneficial effect as those in the method embodiments, detailed description is omitted here in the present embodiments.

Figure 8:
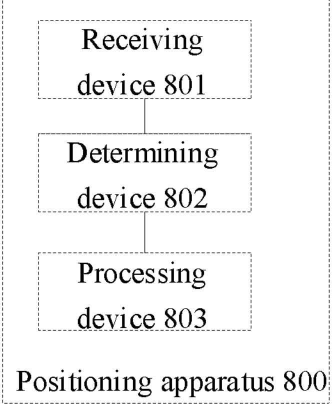
FIG. 8 is a schematic structural diagram of a positioning apparatus according to another embodiment of the present application.

On the primary positioning terminal side, an embodiment of the present application provides a positioning apparatus, applied to a primary positioning terminal. FIG. 8 is a schematic structural diagram of a positioning apparatus according to another embodiment of the present application. As shown in FIG. 8, the positioning apparatus 800 includes:

- a receiving device 801, configured to receive positioning capability information of a first terminal; a determining device 802, configured to determine, according to the positioning capability information of the first terminal, a positioning method for positioning measurement of the first terminal, and transmit the positioning method to the first terminal, where the receiving device 801 is further configured to receive a measurement result obtained from measurement, by the first terminal, of a positioning reference signal with a secondary positioning terminal based on the positioning method; and a processing device 803, configured to obtain a positioning result of the first terminal based on the measurement result, and transmit the positioning result to the first terminal; where the secondary positioning terminal is configured to provide a secondary positioning service.

In another embodiment of the present application, at least two terminals of the first terminal, the primary positioning terminal and the secondary positioning terminal are communicatively connected through a direct communication interface.

In another embodiment of the present application, the receiving device 801 is configured to receive a first measurement result transmitted by the first terminal, where the first measurement result is obtained from measurement, by the first terminal, of a first positioning signal based on the positioning method, and the first positioning signal is transmitted by the secondary positioning terminal to the first terminal; and/or, receive a second measurement result, where the second measurement result is obtained from measurement, by the secondary positioning terminal, of a second positioning signal based on the positioning method, and the second positioning signal is transmitted by the first terminal to the secondary positioning terminal.

In another embodiment of the present application, the positioning apparatus further includes: a transmitting device (not shown), configured to transmit positioning service information to the first terminal through a direct communication interface or a network device.

In another embodiment of the present application, the receiving device 801 is further configured to: receive a positioning service information acquisition request transmitted by the first terminal; and transmit positioning service information to the first terminal according to the positioning service information acquisition request.

In another embodiment of the present application, the receiving device 801 is further configured to: receive a first positioning service message, transmitted by the first terminal through a direct communication interface, indicative of providing the primary positioning service; or receive a first positioning service message, transmitted by a network device, indicative of providing the primary positioning service, where the first positioning service message is transmitted by the first terminal to the network device.

To be noted here, the above-described apparatus provided in the present application can implement all the method steps achieved by the primary positioning terminal in the foregoing method embodiments, and can achieve the same effect. For the same part and beneficial effect as those in the method embodiments, detailed description is omitted here in the present embodiments.

Figure 9:
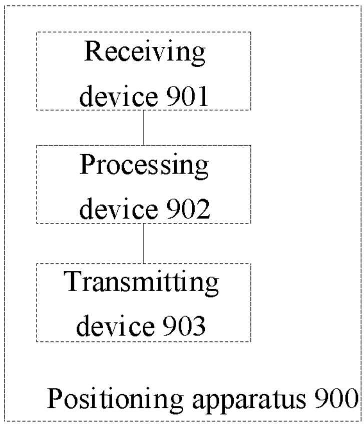
FIG. 9 is a schematic structural diagram of a positioning apparatus according to yet another embodiment of the present application.

On the secondary positioning terminal side, an embodiment of the present application provides a positioning apparatus, applied to a secondary positioning terminal. FIG. 9 is a schematic structural diagram of a positioning apparatus according to an embodiment of the present application. As shown in FIG. 9, the positioning apparatus 900 includes:

- a receiving device 901, configured to receive a positioning method of a first terminal; a processing device 902, configured to perform measurement of a positioning reference signal with the first terminal based on the positioning method to obtain a measurement result; and a transmitting device 903, configured to transmit the measurement result to the first terminal or a primary positioning terminal, where the measurement result is used for the first terminal or the primary positioning terminal to obtain a positioning result of the first terminal, and where the primary positioning terminal is configured to provide a primary positioning service.

In another embodiment of the present application, at least two terminals of the first terminal, the secondary positioning terminal and the primary positioning terminal are communicatively connected through a direct communication interface.

In another embodiment of the present application, if the measurement result includes a first measurement result, the processing device 902 is configured to: transmit a first positioning signal to the first terminal; and receive the first measurement result transmitted by the first terminal, where the first measurement result is obtained from measurement, by the first terminal, of the first positioning signal based on the positioning method.

In another embodiment of the present application, if the measurement result includes a second measurement result, the processing device 902 is configured to: receive a second positioning signal transmitted by the first terminal; and measure the second positioning signal based on the positioning method to obtain the second measurement result.

In another embodiment of the present application, the receiving device 901 is further configured to: receive a second positioning service message, transmitted by the first terminal, indicative of providing the secondary positioning service; or, receive a second positioning service message, transmitted by a network device, indicative of providing the secondary positioning service, where the second positioning service message is transmitted by the first terminal to the network device.

To be noted here, the above-described apparatus provided in the present application can implement all the method steps achieved by the secondary positioning terminal in the foregoing method embodiments, and can achieve the same effect. For the same part and beneficial effect as those in the method embodiments, detailed description is omitted here in the present embodiments.

Figure 10:
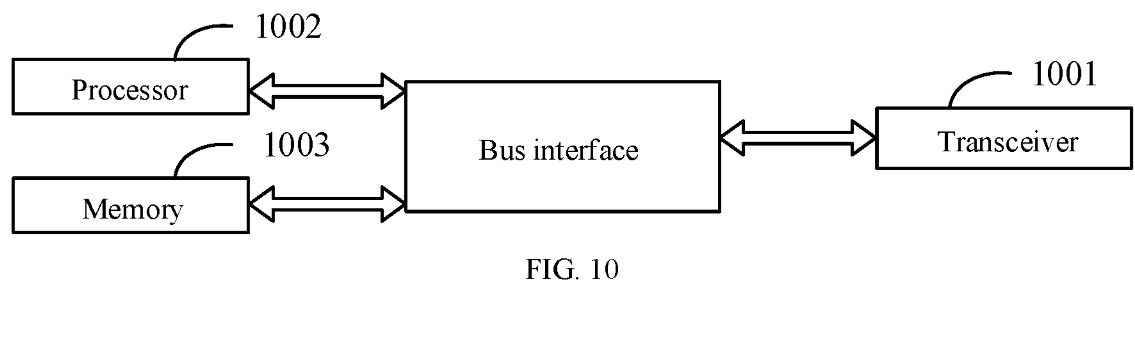
FIG. 10 is a schematic structural diagram of a terminal according to an embodiment of the present application.

FIG. 10 is a schematic structural diagram of a terminal according to an embodiment of the present application. The terminal is a first terminal. As shown in FIG. 10, the first terminal 1000 includes: a transceiver 1001, a processor 1002, and a memory 1003.

The transceiver 1001 is configured to receive and transmit data under control of the processor 1002. In FIG. 10, the bus architecture may include any number of interconnected buses and bridges. In particular, various circuits such as one or more processors represented by the processor 1002 and a memory represented by the memory 1003 are linked together. The bus architecture can also link together a variety of other circuits such as a peripheral device, a voltage regulator and a power management circuit, which are well known in the art and are therefore not described further herein. The bus interface provides an interface. The transceiver 1001 may be of elements, that is, including a transmitter and a receiver, to provide units communicating with various other devices over transmission media; these transmission media include a wireless channel, a wired channel, an optical cable and other transmission media. The processor 1002 is responsible for managing the bus architecture and usual processing, and the memory 1003 can store data used when the processor 1202 performs an operation.

The processor 1002 is responsible for managing the bus architecture and usual processing, and the memory 1003 can store data used when the processor 1002 performs an operation.

In an embodiment of the present application, the processor 1002 may be a central processing unit (CPU), an application specific integrated circuit (ASIC), a field-programmable gate array (FPGA), or a complex programmable logic device (CPLD); and the processor can also adopt a multicore architecture.

The processor 1002, by calling a computer program stored in the memory 1003, is configured to execute, based on the executable instruction acquired, any method with respect to the first terminal according to the embodiments of the present application. The processor and the memory can also be physically separated.

In one embodiment, the processor 1002 is configured to read the computer program in the memory and execute operations of: acquiring positioning service information of a target terminal; determining from the target terminal, according to the positioning service information, a primary positioning terminal for providing a primary positioning service and a secondary positioning terminal for providing a secondary positioning service; and performing positioning for a location of the first terminal based on the primary positioning terminal and the secondary positioning terminal.

In another embodiment of the present application, the first terminal establishes communicative connection with the target terminal through a direct communication interface.

In another embodiment of the present application, the processor 1002 is further configured to execute an operation of receiving, through a direct communication interface, the positioning service information transmitted by the target terminal.

In another embodiment of the present application, the processor 1002 is further configured to execute operations of: transmitting a positioning service information acquisition request to the target terminal through a direct communication interface; and receiving the positioning service information transmitted by the target terminal.

In another embodiment of the present application, the processor 1002 is further configured to execute an operation of acquiring the positioning service information of the target terminal from a network device.

In another embodiment of the present application, the processor 1002 is further configured to execute operations of: transmitting a positioning service information acquisition request to the network device, where the first terminal is located within a coverage range of the network device; and receiving the positioning service information of the target terminal transmitted by the network device.

In another embodiment of the present application, the processor 1002 is further configured to execute operations of: acquiring the positioning service information of the target terminal from a storage medium of the first terminal if it is determined that the first terminal is out of a coverage range of the network device, where the positioning service information of the target terminal is acquired and stored from the network device under a circumstance that the first terminal is within the coverage range of the network device.

In another embodiment of the present application, the processor 1002 is further configured to execute operations of determining from the target terminal, according to the positioning service information, at least one terminal for providing the primary positioning service; and screening from the determined at least one terminal, according to positioning capability information of each determined terminal, a movement speed and a channel condition between the terminal and the first terminal, the primary positioning terminal for providing the primary positioning service.

In another embodiment of the present application, after determining the primary positioning terminal for providing the primary positioning service and the secondary positioning terminal for providing the secondary positioning service are determined, the processor 1002 is further configured to execute an operation of: transmitting, to the primary positioning terminal, a first positioning service message indicative of providing the primary positioning service; or transmitting, to a network device, a first positioning service message indicative of providing the primary positioning service, and the network device, upon reception of the first positioning service message, forwards the first positioning service message to the primary positioning terminal.

In another embodiment of the present application, after determining the primary positioning terminal for providing the primary positioning service and the secondary positioning terminal for providing the secondary positioning service are determined, the processor 1002 is further configured to execute an operation of: transmitting, to the secondary positioning terminal, a second positioning service message indicative of providing the secondary positioning service; or transmitting, to a network device, a second positioning service message indicative of providing the secondary positioning service, and the network device, upon reception of the second positioning service message, forwards the second positioning service message to the secondary positioning terminal.

In another embodiment of the present application, the processor 1002 is further configured to execute operations of transmitting positioning capability information of the first terminal to the primary positioning terminal; receiving a positioning method for positioning measurement of the first terminal determined by the primary positioning terminal according to the positioning capability information; performing measurement of a positioning reference signal with the secondary positioning terminal based on the positioning method to obtain a measurement result; and obtaining the location of the first terminal based on the measurement result.

In another embodiment of the present application, if the measurement result includes a first measurement result, the processor 1002 is further configured to execute operations of: receiving a first positioning signal transmitted by the secondary positioning terminal; and measuring the first positioning signal based on the positioning method to obtain the first measurement result.

In another embodiment of the present application, if the measurement result includes a second measurement result, the processor 1002 is further configured to execute operations of transmitting a second positioning signal to the secondary positioning terminal; and receiving the second measurement result, where the second measurement result is obtained from measurement, by the secondary positioning terminal, of the second positioning signal based on the positioning method.

In another embodiment of the present application, the processor 1002 is further configured to execute operations of: transmitting the first measurement result and/or the second measurement result to the primary positioning terminal; receiving a positioning result transmitted by the primary positioning terminal, and obtaining the location of the first terminal according to the positioning result, where the positioning result is obtained from calculation, by the primary positioning terminal, of the first measurement result and/or the second measurement result based on the positioning method.

In another embodiment of the present application, the processor 1002 is further configured to execute an operation of calculating the first measurement result and/or the second measurement result based on the positioning method to obtain a positioning result of the first terminal.

To be noted here, the above-described terminal provided in the present application can implement all the method steps achieved by the first terminal in the foregoing method embodiments, and can achieve the same effect. For the same part and beneficial effect as those in the method embodiments, detailed description is omitted here in the present embodiments.

Figure 11:
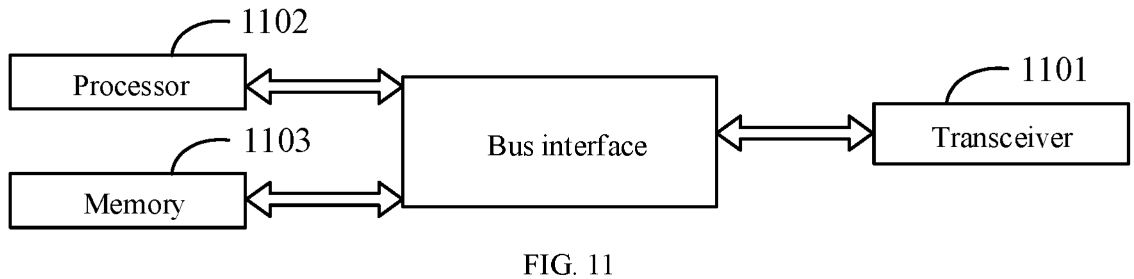
FIG. 11 is a schematic structural diagram of a terminal according to another embodiment of the present application.

FIG. 11 is a schematic structural diagram of a terminal according to another embodiment of the present application. The terminal is a primary positioning terminal and the primary positioning terminal provides a primary positioning service for a first terminal. The primary positioning terminal includes:

a transceiver 1101, a processor 1102, and a memory 1103.

In FIG. 11, the bus architecture may include any number of interconnected buses and bridges. In particular, various circuits such as one or more processors represented by the processor 1102 and a memory represented by the memory 1103 are linked together. The bus architecture can also link together a variety of other circuits such as a peripheral device, a voltage regulator and a power management circuit, which are well known in the art and are therefore not described further herein. The bus interface provides an interface. The transceiver 1101 may be of elements, that is, including a transmitter and a receiver, to provide units communicating with various other devices over transmission media; these transmission media include a wireless channel, a wired channel, an optical cable and other transmission media. The processor 1102 is responsible for managing the bus architecture and usual processing, and the memory 1103 can store data used when the processor 1102 performs an operation.

The processor 1102 may be a CPU, an ASIC, an FPGA, or a CPLD; and the processor can also adopt a multicore architecture.

The processor 1102, by calling a computer program stored in the memory 1103, is configured to execute, based on the executable instruction acquired, any method with respect to the primary positioning terminal according to the embodiments of the present application. The processor and the memory can also be physically separated.

In one embodiment, the processor 1102 is configured to read the computer program in the memory and execute operations of: receiving positioning capability information of the first terminal; determining, according to the positioning capability information of the first terminal, a positioning method for positioning measurement of the first terminal, and transmitting the positioning method to the first terminal; receiving a measurement result obtained from measurement, by the first terminal, of a positioning reference signal with a secondary positioning terminal based on the positioning method; and obtaining a positioning result of the first terminal based on the measurement result, and transmitting the positioning result to the first terminal; where the secondary positioning terminal is configured to provide a secondary positioning service.

In another embodiment of the present application, at least two terminals of the first terminal, the primary positioning terminal and the secondary positioning terminal are communicatively connected through a direct communication interface.

In another embodiment of the present application, the processor 1102 is further configured to execute operations of receiving a first measurement result transmitted by the first terminal, where the first measurement result is obtained from measurement, by the first terminal, of a first positioning signal based on the positioning method, and the first positioning signal is transmitted by the secondary positioning terminal to the first terminal; and/or, receiving a second measurement result, where the second measurement result is obtained from measurement, by the secondary positioning terminal, of a second positioning signal based on the positioning method, and the second positioning signal is transmitted by the first terminal to the secondary positioning terminal.

In another embodiment of the present application, before the receiving the positioning capability information of the first terminal, the processor 1102 is further configured to execute an operation of: transmitting positioning service information to the first terminal through a direct communication interface or a network device.

In another embodiment of the present application, before the receiving the positioning capability information of the first terminal, the processor 1102 is further configured to execute operations of: receiving a positioning service information acquisition request transmitted by the first terminal; and transmitting positioning service information to the first terminal according to the positioning service information acquisition request.

In another embodiment of the present application, before the receiving the positioning capability information of the first terminal, the processor 1102 is further configured to execute an operation of: receiving a first positioning service message, transmitted by the first terminal through a direct communication interface, indicative of providing the primary positioning service; or receiving a first positioning service message, transmitted by a network device, indicative of providing the primary positioning service, where the first positioning service message is transmitted by the first terminal to the network device.

To be noted here, the above-described terminal provided in the present application can implement all the method steps achieved by the primary positioning terminal in the foregoing method embodiments, and can achieve the same effect. For the same part and beneficial effect as those in the method embodiments, detailed description is omitted here in the present embodiments.

Figure 12:
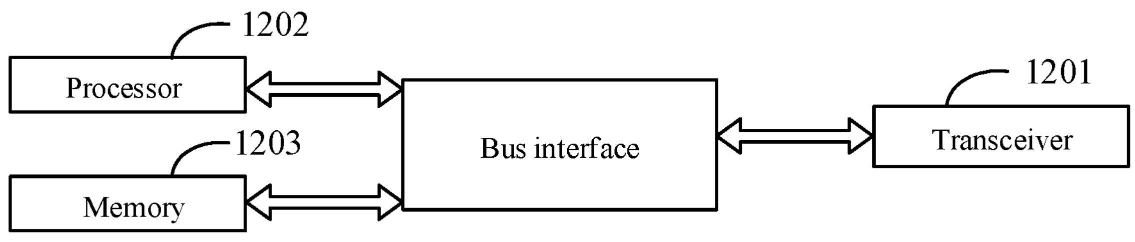
FIG. 12 is a schematic structural diagram of a terminal according to yet another embodiment of the present application.

FIG. 12 is a schematic structural diagram of a terminal according to yet another embodiment of the present application. The terminal is a secondary positioning terminal, and the secondary positioning terminal provides a secondary positioning service for a first terminal. The secondary positioning terminal includes: a transceiver 1201, a processor 1202, and a memory 1203.

The transceiver 1201 is configured to receive and transmit data under control of the processor 1202. In FIG. 12, the bus architecture may include any number of interconnected buses and bridges. In particular, various circuits such as one or more processors represented by the processor 1202 and a memory represented by the memory 1203 are linked together. The bus architecture can also link together a variety of other circuits such as a peripheral device, a voltage regulator and a power management circuit, which are well known in the art and are therefore not described further herein. The bus interface provides an interface. The transceiver 1201 may be of elements, that is, including a transmitter and a receiver, to provide units communicating with various other devices over transmission media; these transmission media include a wireless channel, a wired channel, an optical cable and other transmission media. The processor 1202 is responsible for managing the bus architecture and usual processing, and the memory 1203 can store data used when the processor 1202 performs an operation.

The processor 1202 is responsible for managing the bus architecture and usual processing, and the memory 1203 can store data used when the processor 1202 performs an operation.

In an embodiment of the present application, the processor 1202 may be a central processing unit (CPU), an application specific integrated circuit (ASIC), a field-programmable gate array (FPGA), or a complex programmable logic device (CPLD); and the processor can also adopt a multicore architecture.

The processor 1202, by calling a computer program stored in the memory 1203, is configured to execute, based on the executable instruction acquired, any method with respect to the secondary positioning terminal according to the embodiments of the present application. The processor and the memory can also be physically separated.

In one embodiment, the processor 1202 is configured to read the computer program in the memory and execute operations of receiving a positioning method of the first terminal; performing measurement of a positioning reference signal with the first terminal based on the positioning method to obtain a measurement result; and transmitting the measurement result to the first terminal or a primary positioning terminal, where the measurement result is used for the first terminal or the primary positioning terminal to obtain a positioning result of the first terminal, and where the primary positioning terminal is configured to provide a primary positioning service.

In another embodiment of the present application, at least two terminals of the first terminal, the secondary positioning terminal and the primary positioning terminal are communicatively connected through a direct communication interface.

In another embodiment of the present application, if the measurement result includes a first measurement result, the processor 1202 is further configured to execute operations of: transmitting a first positioning signal to the first terminal; and receiving the first measurement result transmitted by the first terminal, where the first measurement result is obtained from measurement, by the first terminal, of the first positioning signal based on the positioning method.

In another embodiment of the present application, if the measurement result includes a second measurement result, the processor 1202 is further configured to execute operations of: receiving a second positioning signal transmitted by the first terminal; and measuring the second positioning signal based on the positioning method to obtain the second measurement result.

In another embodiment of the present application, before the receiving the positioning method of the first terminal, the processor 1202 is further configured to execute an operation of: receiving a second positioning service message, transmitted by the first terminal, indicative of providing the secondary positioning service; or, receiving a second positioning service message, transmitted by a network device, indicative of providing the secondary positioning service, where the second positioning service message is transmitted by the first terminal to the network device.

To be noted here, the above-described terminal provided in the present application can implement all the method steps achieved by the secondary positioning terminal in the foregoing method embodiments, and can achieve the same effect. For the same part and beneficial effect as those in the method embodiments, detailed description is omitted here in the present embodiments.

It should be noted that the division of the units in the embodiments of the present application is merely exemplary, and is a division of logical functions, moreover, there may be other divisions during actual implementations. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The above-described integrated unit, if being implemented in a form of a software functional unit and sold or used as an independent product, may be stored in a processor-readable storage medium. Based on such understanding, the embodiments of the present application essentially, or the part contributing to the prior art, or all or a part of the embodiments may be embodied in a form of a software product. The computer software product is stored in a storage medium, and includes several instructions enabling a computer device (which may be a personal computer, a server, or a network device) or a processor (processor) to perform all or a part of the steps of the methods described in the embodiments of the present application. The foregoing storage medium includes: any medium for storing program codes, such as a USB flash disk, a mobile hard disk, a read-only memory (ROM), a random access memory (RAM), a magnetic disk, or an optical disc.

On the first terminal side, an embodiment of the present application provides a processor-readable storage medium. The processor-readable storage medium has, stored therein, a computer program enabling a processor to perform the method in connection with the first terminal according to the embodiments of the present application, and the processor can implement all the method steps implemented by the first terminal in the foregoing method embodiments and can achieve the same effect. For the same part and beneficial effect as those in the method embodiments, detailed description is omitted here in the present embodiment.

On the primary positioning terminal side, an embodiment of the present application provides a processor-readable storage medium. The processor-readable storage medium has, stored therein, a computer program enabling a processor to perform the method in connection with the primary positioning terminal according to the embodiments of the present application, and the processor can implement all the method steps implemented by the primary positioning terminal in the foregoing method embodiments and can achieve the same effect. For the same part and beneficial effect as those in the method embodiments, detailed description is omitted here in the present embodiment.

On the secondary positioning terminal side, an embodiment of the present application provides a processor-readable storage medium. The processor-readable storage medium has, stored therein, a computer program enabling a processor to perform the method in connection with the secondary positioning terminal according to the embodiments of the present application, and the processor can implement all the method steps implemented by the secondary positioning terminal in the foregoing method embodiments and can achieve the same effect. For the same part and beneficial effect as those in the method embodiments, detailed description is omitted here in the present embodiment.

The processor-readable storage medium may be any available media or data storage device accessible to the processor, including but not limited to a magnetic memory (such as a floppy disk, a hard disk, a magnetic tape, a magnetic optical (MO) disk or the like), an optical memory (such as a compact disc (CD), a digital video disk (DVD), a blu-ray disc (BD), a holographic versatile disc (HVD) or the like), and a semiconductor memory (such as a ROM, an erasable programmable read-only memory (EPROM), an electrically erasable programmable read-only memory (EEPROM), a non-volatile memory (NAND FLASH), a solid-state disk (SSD)) and the like.

On the first terminal side, an embodiment of the present application further provides a computer program product including a computer program. The computer program is stored in a storage medium from which at least one processor can read the computer program, and the at least one processor, when executing the computer program, can implement all the method steps implemented by the first terminal in the foregoing method embodiments and can achieve the same effect. For the same part and beneficial effect as those in the method embodiments, detailed description is omitted here in the present embodiment.

On the primary positioning terminal side, an embodiment of the present application further provides a computer program product including a computer program. The computer program is stored in a storage medium from which at least one processor can read the computer program, and the at least one processor, when executing the computer program, can implement all the method steps implemented by the primary positioning terminal in the foregoing method embodiments and can achieve the same effect. For the same part and beneficial effect as those in the method embodiments, detailed description is omitted here in the present embodiment.

On the secondary positioning terminal side, an embodiment of the present application further provides a computer program product including instructions. The computer program is stored in a storage medium from which at least one processor can read the computer program, and the at least one processor, when executing the computer program, can implement all the method steps implemented by the secondary positioning terminal in the foregoing method embodiments and can achieve the same effect. For the same part and beneficial effect as those in the method embodiments, detailed description is omitted here in the present embodiment.

An embodiment of the present application further provides a communication system, including a first terminal, a primary positioning terminal and a secondary positioning terminal. The first terminal can perform all the method steps performed by the first terminal in the foregoing method embodiments, and can achieve the same effect. The primary positioning terminal can perform all the method steps performed by the primary positioning terminal in the foregoing method embodiments, and can achieve the same effect. The secondary positioning terminal can perform all the method steps performed by the secondary positioning terminal in the foregoing method embodiments, and can achieve the same effect. For the same part and beneficial effect as those in the method embodiments, detailed description is omitted here in the present embodiments.

The embodiments of the present application may be provided as methods, systems, or computer program products. Accordingly, the present application may take the form of complete hardware embodiments, complete software embodiments, or a combination of software and hardware embodiments. Further, the present application may take the form of computer program products implemented on one or more computer-usable storage media (including but not limited to disk memories and optical memories, etc.) containing computer-usable program codes.

The present application is described with reference to schematic signaling interaction diagrams and/or block diagrams of methods, apparatuses and computer program products according to embodiments of the present application. It will be appreciated that computer-executable instructions can implement each flow and/or block in the schematic signaling interaction diagrams and/or the block diagrams, and a combination of a flow and/or a block in the schematic signaling interaction diagrams and/or the block diagrams. These computer-executable instructions may be provided to a processor of a general purpose computer, a special purpose computer, an embedded processor or other programmable data processing devices to generate a machine, and instructions executed by the processor of the computers or other programmable data processing devices generate a device for performing functions specified in one or more flows of the schematic signaling interaction diagrams and/or one or more blocks of the block diagrams.

These processor-executable instructions may also be stored in a processor-readable memory for directing the computers or other programmable data processing devices to operate in a specific manner, and instructions stored in the processor-readable memory generate a manufactured product including an instruction device, where the instruction device performs functions specified in one or more flows of the schematic signaling interaction diagrams and/or one or more blocks of the block diagrams.

These processor-executable instructions may also be loaded on the computers or other programmable data processing devices, and a series of operation steps are performed in the computers or other programmable devices to generate a computer-implemented process, and thus the instructions executed on the computers or other programmable devices provide steps for performing the functions specified in one or more flows of the schematic signaling interaction diagrams and/or one or more blocks of the block diagrams.

Various modifications and variations to the present application without departing from the spirit and the scope of the present application. Thus, if these modifications and variations of the present application fall into the scope of the claims of the present application and equivalent technologies thereof, then the present application is also intended to include these modifications and variations.

The invention claimed is:

1. A positioning method applied to a first terminal and comprising:

acquiring positioning service information of target terminals, wherein the positioning service information is used to characterize a type of positioning services that is provided by each of the target terminals, the type of positioning services comprising a primary positioning service and a secondary positioning service;

determining, from the target terminals, according to the positioning service information, at least one candidate terminal for providing the primary positioning service;

screening, from the at least one candidate terminal according to positioning capability information of each candidate terminal, a movement speed of each candidate terminal, and a channel condition between each candidate terminal and the first terminal, a primary positioning terminal for providing the primary positioning service, the primary positioning terminal having positioning capability matched with positioning capability of the first terminal, having a lowest movement speed, and having a best channel condition with the first terminal;

determining, from the target terminals according to the positioning service information, a secondary positioning terminal for providing the secondary positioning service, wherein the secondary positioning service comprises performing positioning measurement with the first terminal to obtain a measurement result for determining the location of the first terminal; and performing positioning for a location of the first terminal based on the primary positioning terminal and the secondary positioning terminal, wherein the performing positioning comprises:

transmitting positioning capability information of the first terminal to the primary positioning terminal;

receiving, from the primary positioning terminal, a positioning method for positioning measurement of the first terminal, the positioning method being determined by the primary positioning terminal according to the positioning capability information;

performing measurement of a positioning reference signal with the secondary positioning terminal based on the positioning method to obtain the measurement result; and obtaining the location of the first terminal based on the measurement result;

wherein the first terminal, the target terminals, the primary positioning terminal, and the secondary positioning terminal are each wireless terminals, and the first terminal communicates with the primary positioning terminal and the secondary positioning terminal via a sidelink interface.

2. The positioning method according to claim 1, after the determining the primary positioning terminal for providing the primary positioning service and the secondary positioning terminal for providing the secondary positioning service, further comprising one of the following operations:

transmitting, to the primary positioning terminal via the sidelink interface, a first positioning service message indicative of providing the primary positioning service;

transmitting, to a base station, a first positioning service message indicative of providing the primary positioning service, and the base station, upon reception of the first positioning service message, forwards the first positioning service message to the primary positioning terminal;

transmitting, to the secondary positioning terminal via the sidelink interface, a second positioning service message indicative of providing the secondary positioning service; or transmitting, to a base station, a second positioning service message indicative of providing the secondary positioning service, and the base station, upon reception of the second positioning service message, forwards the second positioning service message to the secondary positioning terminal.

3. The positioning method according to claim 1, wherein if the measurement result comprises a first measurement result, the performing the measurement of the positioning reference signal with the secondary positioning terminal based on the positioning method to obtain the measurement result comprises: receiving a first positioning signal transmitted by the secondary positioning terminal; and measuring the first positioning signal based on the positioning method to obtain the first measurement result;

if the measurement result comprises a second measurement result, the performing the measurement of the positioning reference signal with the secondary positioning terminal based on the positioning method to obtain the measurement result comprises: transmitting a second positioning signal to the secondary positioning terminal; and receiving the second measurement result, wherein the second measurement result is obtained from measurement, by the secondary positioning terminal, of the second positioning signal based on the positioning method.

4. The positioning method according to claim 3, wherein the obtaining the location of the first terminal based on the measurement result comprises one of the following operations:

transmitting the first measurement result and/or the second measurement result to the primary positioning terminal; receiving a positioning result transmitted by the primary positioning terminal, and obtaining the location of the first terminal according to the positioning result, wherein the positioning result is obtained from calculation, by the primary positioning terminal, of the first measurement result and/or the second measurement result based on the positioning method; or calculating the first measurement result and/or the second measurement result based on the positioning method to obtain a positioning result of the first terminal.

5. A positioning method applied to a primary positioning terminal, wherein the primary positioning terminal is configured to provide a primary positioning service for a first terminal, the primary positioning terminal being determined by the first terminal from target terminals by:

determining, from the target terminals according to positioning service information, at least one candidate terminal for providing the primary positioning service, and screening, from the at least one candidate terminal according to positioning capability information of each candidate terminal, a movement speed of each candidate terminal, and a channel condition between each candidate terminal and the first terminal, the primary positioning terminal for providing the primary positioning service, the primary positioning terminal having positioning capability matched with positioning capability of the first terminal, having a lowest movement speed, and having a best channel condition with the first terminal;

wherein the positioning service information is used to characterize a type of positioning services that is provided by each of the target terminals, the type of positioning services comprising the primary positioning service and a secondary positioning service;

and the positioning method comprising:

receiving positioning capability information of the first terminal;

determining, according to the positioning capability information of the first terminal, a positioning method for positioning measurement of the first terminal, and transmitting the positioning method to the first terminal;

receiving a measurement result obtained from measurement, by the first terminal, of a positioning reference signal with a secondary positioning terminal based on the positioning method; and obtaining a positioning result of the first terminal based on the measurement result, and transmitting the positioning result to the first terminal;

wherein the first terminal, the primary positioning terminal, the target terminals, and the secondary positioning terminal are each wireless terminals, the secondary positioning terminal is determined by the first terminal from the target terminals according to the positioning service information and is configured to provide the secondary positioning service, the secondary positioning service comprising performing positioning measurement with the first terminal to obtain the measurement result, and the first terminal communicates with the primary positioning terminal and the secondary positioning terminal via a sidelink interface.

6. The positioning method according to claim 5, wherein at least two terminals of the first terminal, the primary positioning terminal and the secondary positioning terminal are communicatively connected through the sidelink interface.

7. The positioning method according to claim 5, wherein the receiving the measurement result obtained from the measurement, by the first terminal, of the positioning reference signal with the secondary positioning terminal based on the positioning method comprises one of the following operations: receiving a first measurement result transmitted by the first terminal, wherein the first measurement result is obtained from measurement, by the first terminal, of a first positioning signal based on the positioning method, and the first positioning signal is transmitted by the secondary positioning terminal to the first terminal; or receiving a second measurement result, wherein the second measurement result is obtained from measurement, by the secondary positioning terminal, of a second positioning signal based on the positioning method, and the second positioning signal is transmitted by the first terminal to the secondary positioning terminal.

8. The positioning method according to claim 5, before the receiving the positioning capability information of the first terminal, further comprising one of the following operations: transmitting positioning service information to the first terminal through the sidelink interface or via a base station;

receiving a positioning service information acquisition request transmitted by the first terminal; and transmitting positioning service information to the first terminal according to the positioning service information acquisition request; or receiving a first positioning service message, transmitted by the first terminal through the sidelink interface, indicative of providing the primary positioning service; or receiving a first positioning service message, transmitted by a base station, indicative of providing the primary positioning service, wherein the first positioning service message is transmitted by the first terminal to the base station.

9. A wireless or mobile terminal which is a first terminal, wherein the first terminal comprises:

a memory, configured to store a computer program; a processor, configured to read the computer program in the memory; and a transceiver, configured to transceive data under control of the processor;

wherein the processor is configured to execute operations of:

acquiring positioning service information of target terminals, wherein the positioning service information is used to characterize a type of positioning services that is provided by each of the target terminals, the type of positioning services comprising a primary positioning service and a secondary positioning service;

determining, from the target terminals, according to the positioning service information, at least one candidate terminal for providing the primary positioning service;

screening, from the at least one candidate terminal according to positioning capability information of each candidate terminal, a movement speed of each candidate terminal, and a channel condition between each candidate terminal and the first terminal, a primary positioning terminal for providing the primary positioning service, the primary positioning terminal having positioning capability matched with positioning capability of the first terminal, having a lowest movement speed, and having a best channel condition with the first terminal;

determining, from the target terminals according to the positioning service information, a secondary positioning terminal for providing the secondary positioning service, wherein the secondary positioning service comprises performing positioning measurement with the first terminal to obtain a measurement result for determining the location of the first terminal; and performing positioning for a location of the first terminal based on the primary positioning terminal and the secondary positioning terminal, wherein the performing positioning comprises:

transmitting positioning capability information of the first terminal to the primary positioning terminal;

receiving, from the primary positioning terminal, a positioning method for positioning measurement of the first terminal, the positioning method being determined by the primary positioning terminal according to the positioning capability information;

performing measurement of a positioning reference signal with the secondary positioning terminal based on the positioning method to obtain the measurement result; and obtaining the location of the first terminal based on the measurement result;

wherein the target terminals, the primary positioning terminal, and the secondary positioning terminal are each wireless terminals, and the first terminal communicates with the primary positioning terminal and the secondary positioning terminal via a sidelink interface.

10. The wireless or mobile terminal according to claim 9, after determining the primary positioning terminal for providing the primary positioning service and the secondary positioning terminal for providing the secondary positioning service are determined, the processor is further configured to execute one of the following operations:

transmitting, to the primary positioning terminal via the sidelink interface, a first positioning service message indicative of providing the primary positioning service;

transmitting, to a base station, a first positioning service message indicative of providing the primary positioning service, and the base station, upon reception of the first positioning service message, forwards the first positioning service message to the primary positioning terminal;

transmitting, to the secondary positioning terminal via the sidelink interface, a second positioning service message indicative of providing the secondary positioning service; or transmitting, to a base station, a second positioning service message indicative of providing the secondary positioning service, and the base station, upon reception of the second positioning service message, forwards the second positioning service message to the secondary positioning terminal.

11. The wireless or mobile terminal according to claim 9, wherein if the measurement result comprises a first measurement result, the processor is further configured to execute operations of: receiving a first positioning signal transmitted by the secondary positioning terminal; and measuring the first positioning signal based on the positioning method to obtain the first measurement result;

if the measurement result comprises a second measurement result, the processor is further configured to execute operations of: transmitting a second positioning signal to the secondary positioning terminal; and receiving the second measurement result, wherein the second measurement result is obtained from measurement, by the secondary positioning terminal, of the second positioning signal based on the positioning method.

12. The wireless or mobile terminal according to claim 11, wherein the processor is further configured to execute one of the following operations:

transmitting the first measurement result and/or the second measurement result to the primary positioning terminal; receiving a positioning result transmitted by the primary positioning terminal, and obtaining the location of the first terminal according to the positioning result, wherein the positioning result is obtained from calculation, by the primary positioning terminal, of the first measurement result and/or the second measurement result based on the positioning method; or calculating the first measurement result and/or the second measurement result based on the positioning method to obtain a positioning result of the first terminal.

13. A wireless or mobile terminal which is a primary positioning terminal, wherein the primary positioning terminal provides a primary positioning service for a first terminal, and the primary positioning terminal comprises: a memory, configured to store a computer program; a processor, configured to read the computer program in the memory; and a transceiver, configured to transceive data under control of a processor;

wherein the processor is further configured to execute the positioning method according to claim 5.

14. A non-transitory processor-readable storage medium in which a computer program is stored, wherein the computer program is configured to enable a processor to execute the positioning method according to claim 1.

* * * * *